US012580836B2

(12) United States Patent
Zohoorian et al.

(10) Patent No.: US 12,580,836 B2
(45) Date of Patent: Mar. 17, 2026

(54) ORCHESTRATION OF ROUND-TRIP TIME (RTT) MEASUREMENTS

(71) Applicant: Juniper Networks, Inc., Sunnyvale, CA (US)

(72) Inventors: Mohammad Zohoorian, San Francisco, CA (US); Christopher Wesley Wright, Scotts Valley, CA (US); Nagarjun Srinivasan, Sunnyvale, CA (US); Shmuel Shaffer, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 359 days.

(21) Appl. No.: 18/193,205

(22) Filed: Mar. 30, 2023

(65) Prior Publication Data

US 2024/0007378 A1      Jan. 4, 2024

Related U.S. Application Data

(60) Provisional application No. 63/367,354, filed on Jun. 30, 2022.

(51) Int. Cl.
| | |
|---|---|
| *H04L 43/0864* | (2022.01) |
| *H04W 72/0453* | (2023.01) |
| *H04W 24/10* | (2009.01) |

(52) U.S. Cl.
CPC ..... *H04L 43/0864* (2013.01); *H04W 72/0453* (2013.01); *H04W 24/10* (2013.01)

(58) Field of Classification Search
CPC ............. H04L 43/0864; H04L 41/0893; H04L 41/342; H04L 41/122; H04L 41/145;
(Continued)

(56) References Cited

U.S. PATENT DOCUMENTS

| | | | |
|---|---|---|---|
| 9,832,082 B2 | 11/2017 | Dade et al. | |
| 10,397,928 B1 * | 8/2019 | Hahn | ................... H04W 24/02 |

(Continued)

FOREIGN PATENT DOCUMENTS

| | | |
|---|---|---|
| WO | 2010059934 A2 | 5/2010 |
| WO | 2015103538 A1 | 7/2015 |

OTHER PUBLICATIONS

Response to Extended Search Report dated Nov. 21, 2023, from counterpart European Application No. 23181009.4 filed Jul. 3, 2024, 18 pp.

(Continued)

*Primary Examiner* — Abdullahi E Salad
(74) *Attorney, Agent, or Firm* — Shumaker & Sieffert, P.A.

(57) ABSTRACT

Techniques are described for orchestration of measurements between a plurality of devices in a wireless network. In an example, a computing system configured to orchestrate round-trip time (RTT) measurements in a network of a plurality of wireless devices comprises one or more processors and a memory comprising instructions that when executed by the one or more processors, cause the one or more processors to: generate a network graph of the plurality of wireless devices in which each wireless device pair of a plurality of wireless device pairs of the network graph is connected by an edge assigned to an identifier, wherein each edge of at least two adjacent edges is assigned a different identifier; and orchestrate the RTT measurements such that RTT measurements between wireless device pairs connected by edges assigned to a same identifier are performed in parallel.

20 Claims, 16 Drawing Sheets

(58) Field of Classification Search
    CPC .. H04L 43/20; H04W 72/0453; H04W 24/10;
                        H04W 24/02; H04W 24/08
    See application file for complete search history.

(56)                     References Cited

U.S. PATENT DOCUMENTS

| | | | |
|---|---|---|---|
| 10,764,858 | B2 | 9/2020 | Srinivasan et al. |
| 10,862,742 | B2 | 12/2020 | Singh |
| 10,958,537 | B2 | 3/2021 | Safavi |
| 10,958,585 | B2 | 3/2021 | Safavi |
| 10,985,969 | B2 | 4/2021 | Safavi |
| 10,986,607 | B2 | 4/2021 | Ta et al. |
| 11,422,224 | B2 | 8/2022 | Castagnoli |
| 11,570,038 | B2 | 1/2023 | Wang et al. |
| 2002/0059622 | A1* | 5/2002 | Grove ................. H04L 61/4511 |
| | | | 725/91 |
| 2002/0116154 | A1* | 8/2002 | Nowak ................... H04L 41/12 |
| | | | 702/186 |
| 2018/0227243 | A1* | 8/2018 | Zhang ................. H04L 43/0852 |
| 2021/0243558 | A1 | 8/2021 | Castagnoli et al. |
| 2022/0191647 | A1 | 6/2022 | Zohoorian et al. |
| 2022/0337495 | A1 | 10/2022 | Safavi |
| 2023/0069236 | A1 | 3/2023 | Kozin et al. |
| 2024/0223435 | A1* | 7/2024 | Chan ...................... H04L 41/12 |

OTHER PUBLICATIONS

Extended Search Report from counterpart European Application No. 23181009.4 dated Nov. 21, 2023, 10 pp.
Han et al., "Indoor NLOS Positioning System Based on Enhanced CSI Feature with Intrusion Adaptability", School of Electronic Engineering, Beijing University of Posts and Telecommunications, Sensors (Basel), Beijing, CN, Feb. 22, 2020, 25 pp.
U.S. Appl. No. 17/810,173, filed Jun. 30, 2022, naming inventors Zohoorian et al.
U.S. Appl. No. 63/243,616, filed Sep. 13, 2021, naming inventor Safavi.
U.S. Appl. No. 63/363,353, filed Apr. 21, 2022, naming inventors Zohoorian et al.
Communication pursuant to Article 94(3) EPC from counterpart European Application No. 23181009.4 dated Dec. 11, 2025, 5 pp.

\* cited by examiner

| | |
|---|---|
| – – – – | PURPLE |
| ▬▬▬▬ | PINK |
| ●●●●●●● | RED |
| ———— | ORANGE |
| - - - - - | YELLOW |
| ·················· | GREEN |
| ·-·-·-·-·- | BLUE |

ORCHESTRATION OF ROUND-TRIP TIME (RTT) MEASUREMENTS

This application claims the benefit of U.S. Provisional Patent Application No. 63/367,354, filed Jun. 30, 2022, the entire contents of which is incorporated herein by reference.

TECHNICAL FIELD

The disclosure relates generally to computer networks and, more specifically, to communication in a wireless network.

BACKGROUND

Commercial premises, such as offices, hospitals, airports, stadiums, or retail outlets, often include a network of wireless access points (APs) installed throughout the premises to provide wireless network services to one or more wireless client devices. APs enable client devices to wirelessly connect to a wired network using various wireless networking protocols and technologies, such as wireless local area networking protocols conforming to one or more of the IEEE 802.11 standards (i.e., "Wi-Fi"), Bluetooth/Bluetooth Low Energy (BLE), mesh networking protocols such as ZigBee or other wireless networking technologies. Many different types of wireless client devices, such as laptop computers, smartphones, tablets, wearable devices, appliances, and Internet of Things (IoT) devices, incorporate wireless communication technology and can be configured to connect to wireless access points when the device is in range of a compatible wireless access point in order to access a wired network. Location services that may be provided in conjunction with a wireless network include wayfinding, location-based proximity notifications, asset tracking, and location-based analytics that derive insights from client mobility through the premises.

SUMMARY

In general, this disclosure describes techniques for orchestration of measurements between a plurality of wireless devices in a wireless network. In some examples, the measurements are round-trip time (RTT) measurements. In some examples, the wireless devices are access points (APs) deployed to establish a wireless network. In accordance with one or more techniques of the disclosure, a computing device, such as a computing device of a network management system (NMS) configured to monitor and manage the plurality of wireless devices, assigns identifiers to edges in a network graph (e.g., connections between two or more nodes in a network graph) of the plurality of wireless devices such that no two adjacent edges are assigned to the same identifier. Two edges are said to be adjacent if they are connected to the same vertex (e.g., wireless device/AP). The identifier assigned to a wireless device pair corresponds to the identifier assigned to their connecting edge. The NMS orchestrates the RTT measurements such that wireless device pairs connected by edges assigned to the same identifier perform simultaneous (e.g., parallel) RTT measurements and wireless device pairs connected by edges assigned to different identifiers do not perform RTT measurements during a single iteration. In this way, conflicts in which the same wireless device belonging to two or more different wireless device pairs assigned to perform RTT measurements during a single iteration are avoided. In some examples, the parallel measurements are performed using different signals/messages over different communication channels (e.g., frequency bands). In some examples, one or more of the communication channels are reused in areas (sub-regions) of the network where it is deemed that the reuse of communication channels is unlikely to cause interference. The RTT measurements between the wireless device pairs may be used to determine the locations of one or more wireless devices (e.g., APs) deployed at a site. The techniques described herein may also apply to determining locations of any type of wireless devices associated with a wireless network.

The techniques of the disclosure may provide one or more technical advantages and practical applications. As an example, the techniques described herein reduce the amount of time it takes to obtain RTT measurements between a plurality of devices (e.g., APs or any other wireless devices) associated with a wireless network. In examples where the wireless devices are APs, neither AP of an AP pair can provide wireless networking services during performance of RTT measurements. It is therefore desirable to complete the RTT measurements for an entire network in the shortest amount of time in order to reduce downtime of the network. By orchestrating RTT measurements in accordance with the techniques of the disclosure, conflicts in which the same AP belonging to two or more different AP pairs assigned to perform RTT measurements during the same time period are avoided. At the same time, the number of RTT measurements between pairs of APs that can be performed in parallel is optimized, thus increasing the speed with which RTT measurements for the entire network can be performed. In some examples, the techniques further split a network of wireless devices into two or more sub-regions and configure the APs in each sub-region to perform parallel RTT measurements, thus increasing the number of RTT measurements that can be performed in parallel with minimal effect on the provision of wireless networking services. Further, the RTT measurements obtained using the orchestration techniques of the disclosure may be used as a basis to automatically determine locations of a plurality of deployed APs in a wireless network with respect to a global coordinate system for the site. The ability to automatically determine locations of deployed APs increases the speed and reduces the cost to deploy a wireless network because it is not necessary to dispatch technicians to conduct a survey of the entire site. The orchestration of RTT measurements in accordance with the techniques of the disclosure also increases the accuracy of the determined AP locations as compared to the error-prone and time-consuming process of manually measuring and logging hundreds or even thousands of AP locations. The techniques therefore support the provisioning of highly accurate location-based services at a site, which depend upon the locations of each of the APs being known to a high degree of accuracy, with minimal or no downtime required to execute the RTT measurements. In addition, the determined AP locations may further be used for radio frequency (RF) coverage optimization and radio resource management of the APs at the site, such as channel and transmit power level selection.

In one example, the disclosure describes a computing system configured to orchestrate round-trip time (RTT) measurements in a network of a plurality of wireless devices, the computing system comprising: one or more processors; and a memory comprising instructions that when executed by the one or more processors cause the one or more processors to: generate a network graph of the plurality of devices in which each wireless device pair of a plurality of wireless device pairs of the network graph is connected by an edge assigned to an identifier, wherein each edge of at least two adjacent edges is assigned to a different identifier; and orchestrate the RTT measurements such that RTT measurements between wireless device pairs connected by edges assigned to a same identifier are performed in parallel.

In another example, the disclosure describes a method of orchestrating round-trip time (RTT) measurements in a network of a plurality of wireless devices, comprising: generating a network graph of the plurality of wireless devices in which each wireless device pair of a plurality of wireless device pairs of the network graph is connected by an edge assigned to an identifier, wherein each edge of at least two adjacent edges is assigned to a different identifier; and orchestrating the RTT measurements such that RTT measurements between wireless device pairs connected by edges assigned to a same identifier are performed in parallel.

In another example, the disclosure describes a non-transitory computer-readable medium comprising instructions that when executed by the one or more processors cause the one or more processors to: generate a network graph of a plurality of wireless devices in which each wireless device pair of a plurality of wireless device pairs of the network graph is connected by an edge assigned to an identifier, wherein each edge of at least two adjacent edges is assigned to a different identifier; and orchestrate the RTT measurements such that RTT measurements between wireless device pairs connected by edges assigned to a same identifier are performed in parallel.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1A:
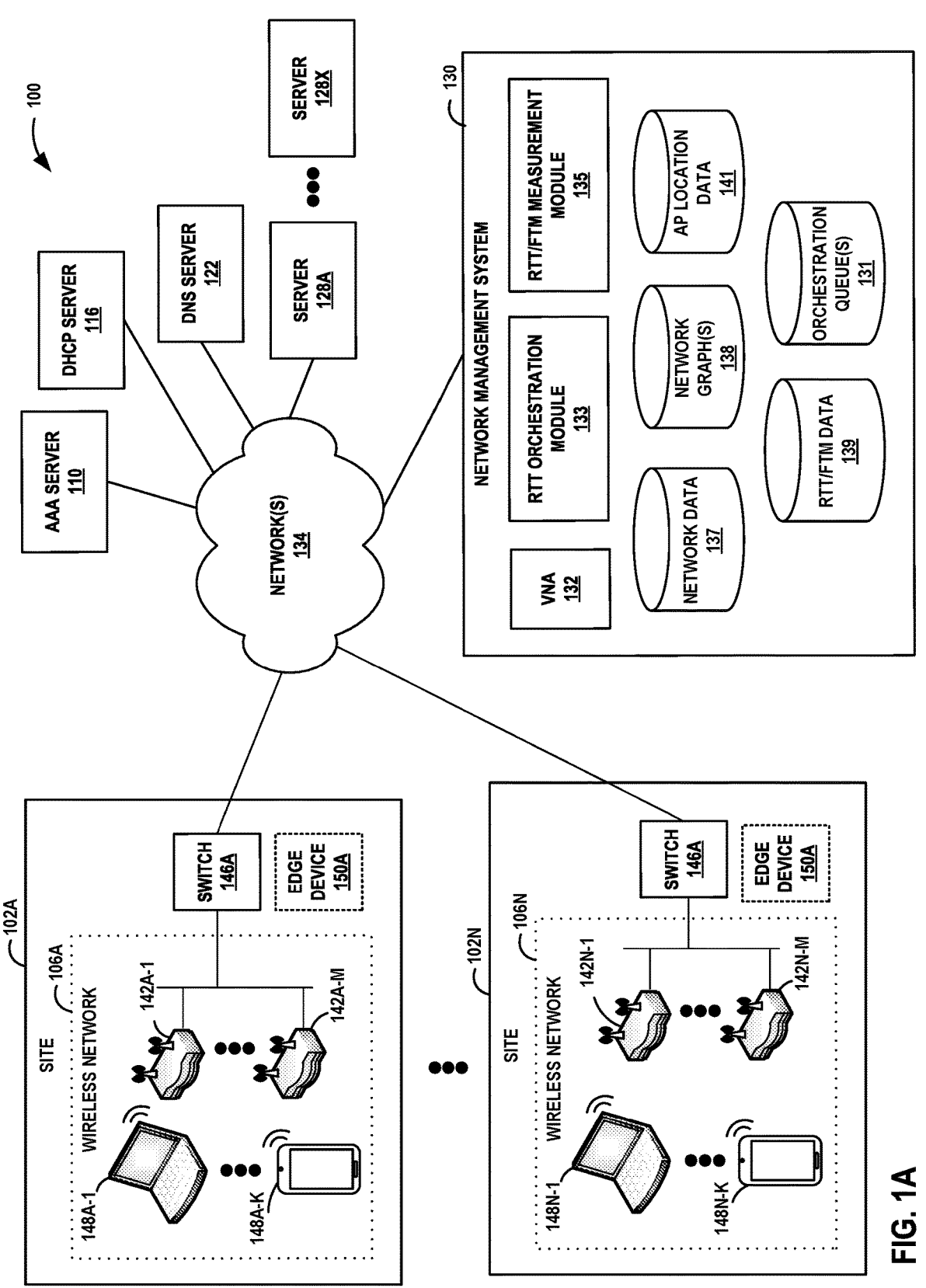
FIG. 1A is a diagram of an example network system 100 that determines locations of deployed access points (APs), in accordance with one or more techniques of the disclosure.

FIG. 1A is a diagram of an example network system 100 in which RTT measurements between a plurality of devices (e.g., APs) in a wireless network are orchestrated in accordance with one or more techniques of the disclosure. Example network system 100 includes a plurality sites 102A-102N at which a network service provider manages one or more wireless networks 106A-106N, respectively. Although in FIG. 1A each site 102A-102N is shown as including a single wireless network 106A-106N, respectively, in some examples, each site 102A-102N may include multiple wireless networks, and the disclosure is not limited in this respect. In addition, although the examples will be described herein with respect to orchestration of RTT measurements between a plurality of APs in a wireless network, the techniques described herein may also be applied to performing any type of measurement for any type of computing devices in a wireless network. In addition to RTT measurements, the measurements that may be orchestrated may include, for example, channel state information (CSI), and any other information measured in a wireless network. In the RTT example, the RTT measurements may be used to determine the locations (e.g., coordinates) of the plurality of APs in the wireless network. The locations of the APs may be used to locate one or more wireless devices, such as wireless client devices (e.g., smartphones or other mobile computing devices, laptop or desktop computing devices, wireless tags, equipment, IoT devices, etc.) associated with the wireless network.

Sites 102, such as enterprises, offices, hospitals, airports, stadiums, or retail outlets, often install complex wireless network systems, including a network of wireless access point (AP) devices, e.g., AP devices 142, throughout the premises to provide wireless network services to one or more wireless client devices. In this example, site 102A includes a plurality of AP devices 142A-1 through 142A-N. Similarly, site 102N includes a plurality of AP devices 142N-1 through 142N-N. Each AP device 142 may be any type of wireless access point, including, but not limited to, a commercial or enterprise access point, a router, or any other device capable of providing wireless network access.

Each site 102A-102N also includes a plurality of client devices, otherwise known as user equipment devices (UEs), referred to generally as client devices 148 or UEs 148, representing various wireless-enabled devices within each site. For example, a plurality of UEs 148A-1 through 148A-N are currently located at site 102A. Similarly, a plurality of UEs 148N-1 through 148N-K are currently located at site 102N. Each UE 148 may be any type of wireless client device, including, but not limited to, a mobile device such as a smartphone, tablet or laptop computer, a personal digital assistant (PDA), a wireless terminal, a smart watch, smart ring or other wearable device. UEs 148 may also include IoT client devices such as printers, security devices, environmental sensors, appliances, or any other device configured to communicate over one or more wireless networks.

Example network system 100 also includes various networking components for providing networking services within the wired network including, as examples, an Authentication, Authorization and Accounting (AAA) server 110 for authenticating users and/or UEs 148, a Dynamic Host Configuration Protocol (DHCP) server 116 for dynamically assigning network addresses (e.g., IP addresses) to UEs 148 upon authentication, a Domain Name System (DNS) server 122 for resolving domain names into network addresses, a plurality of servers 128 (e.g., web servers, databases servers, file servers and the like), and a network management system (NMS) 130. As shown in FIG. 1A, the various devices and systems of network 100 are coupled together via one or more network(s) 134, e.g., the Internet and/or an enterprise intranet. Each one of the servers 110, 116, 122 and/or 128, AP devices 142, UEs 148, NMS 130, and any other servers or devices attached to or forming part of network system 100 may include a system log or an error log module wherein each one of these devices records the status of the device including normal operational status and error conditions.

In the example of FIG. 1A, NMS 130 is a cloud-based computing platform that manages wireless networks 106A-106N at one or more of sites 102A-102N. As further described herein, NMS 130 provides an integrated suite of wireless network management tools and implements various techniques of the disclosure.

NMS 130 monitors network data associated with wireless networks 106A-106N at each site 102A-102N, respectively, to deliver a high-quality wireless network experience to end users, IoT devices and clients at the site. The network data may include a plurality of states or parameters indicative of one or more aspects of wireless network performance. The data may be ingested form numerous sources, including client devices, APs, switches, firewalls, etc. The network data may be stored in a database, such as network data 137 within NMS 130 or, alternatively, in an external database. In general, NMS 130 may provide a cloud-based platform for network data acquisition, monitoring, activity logging, reporting, predictive analytics, network anomaly identification, and alert generation. In some examples, NMS 130 uses a combination of artificial intelligence, machine learning, and data science techniques to optimize user experiences and simplify operations across any one or more of wireless access, wired access, and SD-WAN domains.

NMS 130 observes, collects and/or receives network data 137 for a variety of client devices, such as SDK clients, named assets, and/or client devices connected/unconnected to the wireless network. The network data is indicative of one or more aspects of wireless network performance. Network data 137 may take the form of data extracted from messages, counters and statistics, for example. The network data may be collected and/or measured by one or more UEs 148 and/or one or more AP devices 142 in a wireless network 106. Some of the network data 137 may be collected and/or measured by other devices in the network system 100, such as switches or firewalls. In accordance with one example implementation, network management server 130 includes at least one computing device or processor. In accordance with other implementations, NMS 130 may comprise one or more computing devices, processors, dedicated servers, virtual machines, containers, services or other forms of environments for performing the techniques described herein.

NMS 130 may include a virtual network assistant (VNA) 132 that analyzes network data received from one or more UEs 148 and/or one or more AP devices 142 in a wireless network, provides real-time insights and simplified troubleshooting for IT operations, and automatically takes remedial action or provides recommendations to proactively address wireless network issues. VNA 132 may, for example, include a network data processing platform configured to process hundreds or thousands of concurrent streams of network data from UEs 148, sensors and/or agents associated with AP devices 142 and/or nodes within network 134. For example, VNA 132 of NMS 130 may include a network performance engine that automatically determines one or more service level experience (SLE) metrics for each client device 148 in a wireless network 106. SLE metrics determined based on the collected network data can be used to measure various aspects of wireless network performance. SLE metrics seek to measure and understand network performance from the viewpoint of the end user experience on the network. One example SLE metric is a coverage metric, which tracks the number of user minutes that a client's device received signal strength indicator (RSSI) as measured by an access point with which the client is associated is below a configurable threshold. Another example SLE metric is a roaming metric, which tracks a client's percentage of successful roams between two access points that are within prescribed latency (e.g., time-based) thresholds. Other example SLE metrics may include time to connect, throughput, successful connects, capacity, AP health, and/or any other metric that may be indicative of one or more aspects of wireless network performance. The SLE metrics may also include parameters such as an RSSI of a received wireless signal as measured by the client device, a signal-to-noise ratio (SNR) of the wireless signal as measured by the client device, etc. The thresholds may be customized and configured by the wireless network service provider to define service level expectations at the site. The network service provider may further implement systems that automatically identify the root cause(s) of any SLE metrics that do not satisfy the thresholds, and/or that automatically implement one or more remedial actions to address the root cause, thus automatically improving wireless network performance.

VNA 132 may also include an underlying analytics and network error identification engine and alerting system. VNA 132 may further provide real-time alerting and reporting to notify administrators or IT personnel of any predicted events, anomalies, trends, and may perform root cause analysis and automated or assisted error remediation.

In some examples, VNA 132 of NMS 130 may apply machine learning techniques to identify the root cause of error conditions or poor wireless network performance metrics detected or predicted from the streams of event data. VNA 132 may generate a notification indicative of the root cause and/or one or more remedial actions that may be taken to address the root cause of the error conditions or poor wireless network performance metrics. In some examples, if the root cause may be automatically resolved, VNA 132 invokes one or more remedial or mitigating actions to address the root cause of the error condition or poor wireless network performance metrics, thus automatically improving the underlying wireless network performance metrics (e.g., one or more SLE metrics) and also automatically improving the user experience of the wireless network.

Computational resources and components implementing VNA 132 may be part of the NMS 130, may execute on other servers or execution environments, or may be distributed to nodes within network 134 (e.g., routers, switches, controllers, gateways and the like). Example details of these and other operations implemented by the VNA 132 and/or NMS 130 are described in U.S. application Ser. No. 14/788,489, filed Jun. 30, 2015, and entitled "Monitoring Wireless Access Point Events," U.S. application Ser. No. 16/835,757, filed Mar. 31, 2020, and entitled "Network System Fault Resolution Using a Machine Learning Model," U.S. application Ser. No. 16/279,243, filed Feb. 19, 2019, and entitled "Systems and Methods for a Virtual Network Assistant," U.S. application Ser. No. 16/237,677, filed Dec. 31, 2018, and entitled "Methods and Apparatus for Facilitating Fault Detection and/or Predictive Fault Detection," U.S. application Ser. No. 16/251,942, filed Jan. 18, 2019, and entitled "Method for Spatio-Temporal Modeling," U.S. application Ser. No. 16/296,902, filed Mar. 8, 2019, and entitled "Method for Conveying AP Error Codes Over BLE Advertisements," and U.S. application Ser. No. 17/303,222, filed May 24, 2021, and entitled, "Virtual Network Assistant Having Proactive Analytics and Correlation Engine Using Unsupervised ML Model," all of which are incorporated herein by reference in their entirety.

In accordance with the techniques described in this disclosure, NMS 130 includes an RTT orchestration module 133 configured to orchestrate round-trip time (RTT) measurements between a plurality of devices such as deployed access points (APs) in a wireless network. NMS 130 also includes an RTT/FTM measurement module 135 configured to determine a distance between a pair of devices such as APs based on RTT measurement(s) between the pair of devices e.g., APs.

In some examples, NMS 130 also includes an AP location module (see FIG. 3) configured to determine locations of deployed APs in a wireless network based on the RTT distance measurements between pairs of APs determined in accordance with one or more techniques of the disclosure. In some examples, NMS 130 also includes a location engine (see FIG. 3) configured to determine locations of one or more wireless client devices (e.g., UEs 148) associated with a wireless network based on the determined locations of the deployed APs.

In accordance with one or more techniques of the disclosure, a computing device, such as NMS 130 executing RTT orchestration module 133, orchestrates RTT measurements between a plurality of devices in a wireless network. In some examples, the devices are access points (APs) deployed to establish a wireless network. In accordance with one or more techniques of the disclosure, a computing device, such as a computing device of NMS 130 configured to monitor and manage the plurality of devices in the network, assigns identifiers to edges in a network graph (e.g., connections between nodes in a network graph) of the plurality of devices such that no two adjacent edges are assigned to the same identifier. Two edges are said to be adjacent if they are connected to the same vertex (e.g., device/AP). The identifier assigned to a device pair corresponds to the identifier assigned to their connecting edge. NMS 130 orchestrates the RTT measurements such that device pairs assigned to the same identifier perform RTT measurements in parallel (e.g., simultaneous or near-simultaneous). In this way, conflicts in which the same wireless device belonging to two or more different device pairs assigned to perform RTT measurements during a single iteration are avoided. In some examples, the parallel measurements are performed using different signals/messages over different communication channels (e.g., frequency bands). In some examples, one or more of the communication channels are reused in areas (sub-regions) of the network where it is deemed that the reuse of communication channels is unlikely to cause interference. The RTT measurements between the device pairs may be used to determine the locations of one or more devices (e.g., APs) deployed at a site. The techniques described herein may also apply to determining locations of any type of wireless devices associated with a wireless network (e.g., client devices).

Although the RTT orchestration techniques are described herein as being executed by a cloud-based NMS 130, the RTT orchestration techniques may be implemented by any computing device, regardless of the specific deployment location, configured to monitor or control one or more aspects of wireless network performance at the sites 102. For example, a local computing device (e.g., server) deployed at each of the sites, or other edge computing device deployed with respect to a group of sites, may include and execute RTT orchestration module 133 to orchestrate RTT measurements between a plurality of devices (e.g., APs) deployed at the associated site or sites. The disclosure is therefore not limited with respect to the location (e.g., cloud-based computing, edge computing, local computing, or any combination thereof) of the computing device or the computing techniques configured to perform the RTT orchestration techniques described herein.

Figure 1B:
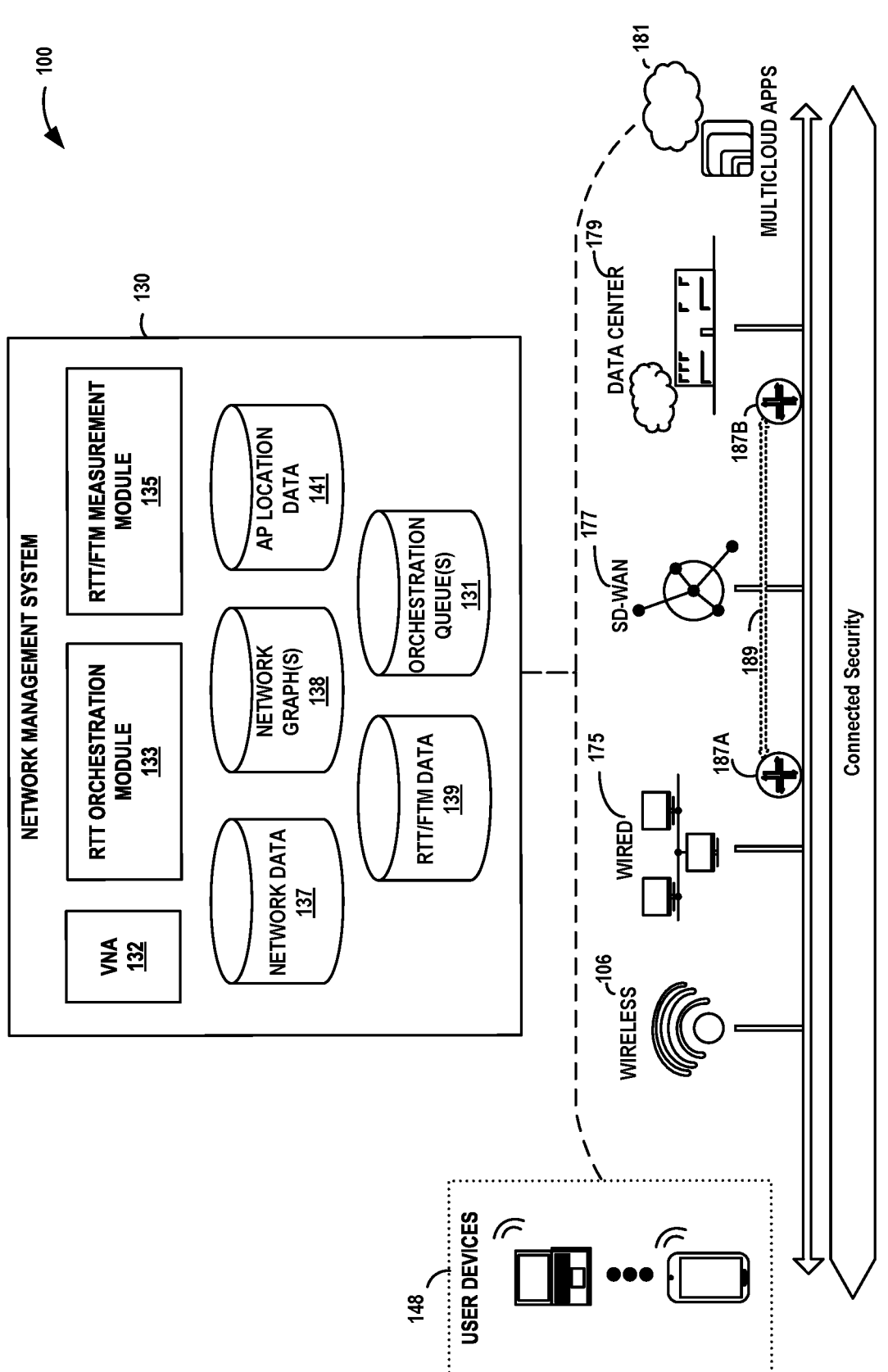
FIG. 1B is a block diagram illustrating further example details of the network system of FIG. 1A.

FIG. 1B is a block diagram illustrating further example details of the network system of FIG. 1A. As described above with respect to FIG. 1A, NMS 130 executing RTT orchestration module 133, orchestrates RTT measurements between a plurality of devices (e.g., APs) in a wireless network in accordance with one or more techniques of the disclosure.

In this example, FIG. 1B illustrates NMS 130 configured to operate according to an artificial intelligence/machine-learning-based computing platform providing comprehensive automation, insight, and assurance (Wi-Fi Assurance, Wired Assurance and WAN assurance) spanning from wireless network 106 and wired LAN 175 networks at the network edge (far left of FIG. 1B) to cloud-based application services 181 hosted by computing resources within data centers 179 (far right of FIG. 1). NMS 130 includes a virtual network assistant 133, AP location module 135, network data 137, network graph data 138 and AP location data 139.

As described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. For example, network management system 130 may be configured to proactively monitor and adaptively configure network 100 so as to provide self-driving capabilities. Moreover, VNA 132 includes a natural language processing engine to provide AI-driven support and troubleshooting, anomaly detection, AI-driven location services, and AI-drive RF optimization with reinforcement learning.

Figure 2:
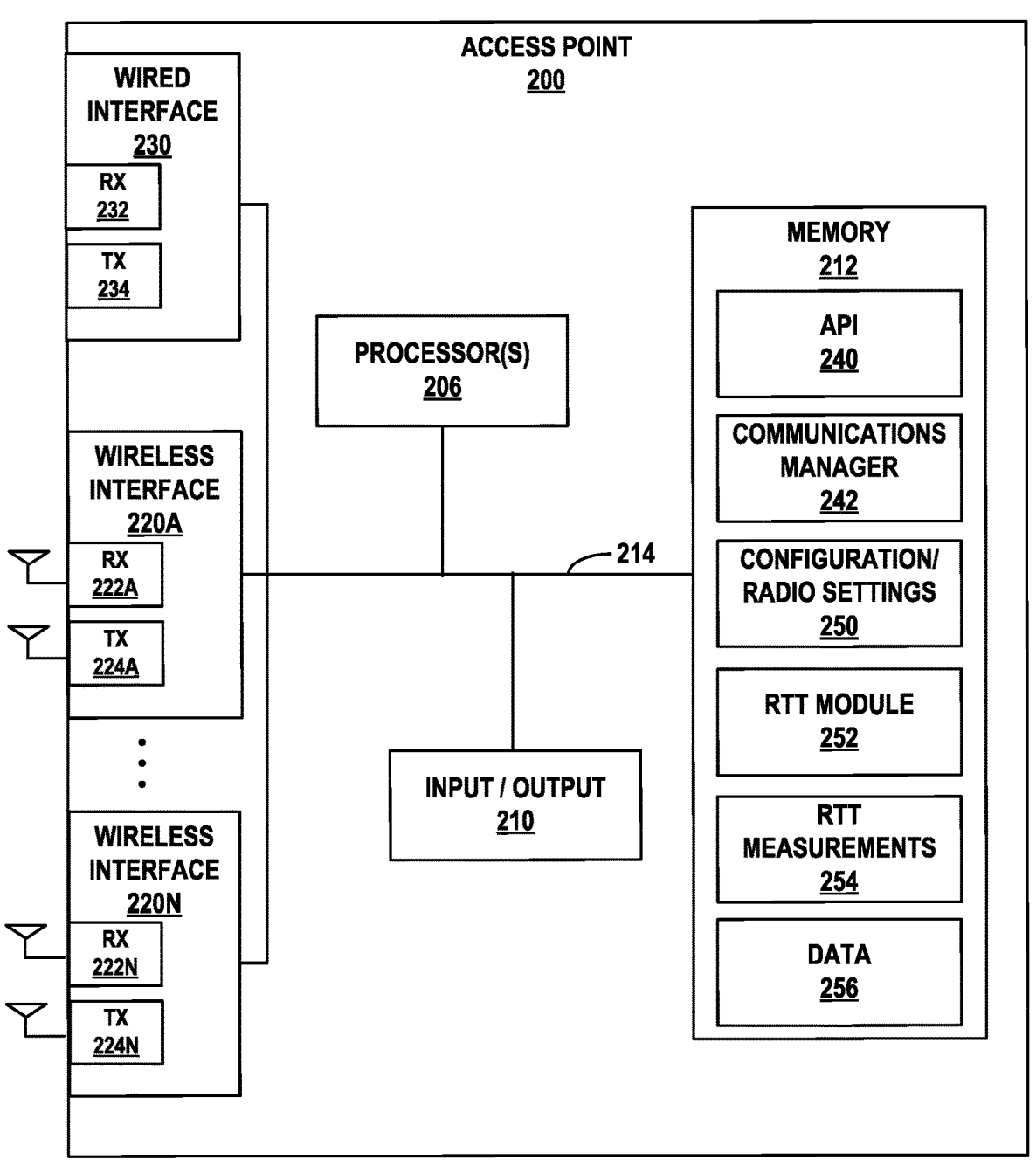
FIG. 2 is a block diagram of an example access point device in accordance with one or more techniques of the disclosure.

FIG. 2 is a block diagram of an example access point (AP) device 200 configured in accordance with one or more techniques of the disclosure. Example access point 200 shown in FIG. 2 may be used to implement any of AP devices 142 as shown and described herein with respect to

9

FIG. 1A. Access point 200 may comprise, for example, a Wi-Fi, Bluetooth and/or Bluetooth Low Energy (BLE) base station or any other type of wireless access point.

In the example of FIG. 2, access point 200 includes a wired interface 230, wireless interfaces 220A-220N, one or more processor(s) 206, memory 212, and a user interface 210, coupled together via a bus 214 over which the various elements may exchange data and information. Wired interface 230 represents a physical network interface and includes a receiver 232 and a transmitter 234 for sending and receiving network communications, e.g., packets. Wired interface 230 couples, either directly or indirectly, access point 200 to network(s) 134 of FIG. 1A. Wireless interfaces 220A-220N represent wireless network interfaces and include receivers 222A-222N, respectively, each including a receive antenna via which access point 200 may receive wireless signals from wireless communications devices, such as UEs 148 of FIG. 1A, other access points, and/or any other wireless device. Wireless interfaces 220A-220N further include transmitters 224A-224N, respectively, each including transmit antennas via which access point 200 may transmit wireless signals to wireless communications devices, such as UEs 148 of FIG. 1A, other access points, and/or any other wireless device. In some examples, wireless interfaces 220A-200N may include one or more Wi-Fi 802.11 interfaces (e.g., 2.4 GHz and/or 5 GHz) one or more Bluetooth interface and/or a Bluetooth Low Energy (BLE) interfaces. One or more of the interfaces (e.g., wireless interfaces 220) may be used to perform RTT measurements. However, these are given for example purposes only, and the disclosure is not limited in this respect.

Processor(s) 206 are programmable hardware-based processors configured to execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or RAM) or any other type of volatile or non-volatile memory, that stores instructions to cause the one or more processors 206 to perform one or more of the techniques described herein.

Memory 212 includes one or more devices configured to store programming modules and/or data associated with operation of access point 200. For example, memory 212 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 206 to perform one or more of the techniques described herein.

In this example, memory 212 stores executable software including an application programming interface (API) 240, a communications manager 242, configuration/radio settings 250, an RTT module 252, data storage of RTT measurements 254, and data storage 256. RTT module 252 includes instructions that, when executed by processor(s) 206 of access point 200, control performance of an RTT measurement procedure between AP 200 and another device such as another AP. In general, the protocol for performing the RTT measurements is defined by the IEEE 802.11mc standard. The RTT measurements are indicative of a distance between a pair of APs. The resulting RTT measurements are stored as RTT measurement data 254 and, in some examples, the RTT measurements are communicated to one or more computing devices, such as NMS 130, for determination of distances between pairs of APs based on the RTT measurements. In addition, or alternatively, AP 200 may determine distances between itself and one or more other APs based on the RTT measurements between the APs.

In some examples, network data stored in data storage 256 includes other types of data indicative of distances between AP 200 and one or more neighboring wireless devices such as APs, such as received signal strength indicators (RSSIs) of wireless signals received from the neighboring APs. Data 256 may further store any data used and/or generated by access point 200, including data collected from UEs 148 and/or one or more other APs 200.

Communications manager 242 includes program code that, when executed by processor(s) 206, allow access point 200 to communicate with UEs 148 and/or network(s) 134 via any of interface(s) 230 and/or 220A-220N. Configuration settings 250 include any device settings for access point 200 such as radio settings for each of wireless interface(s) 220A-220N. These settings may be configured manually or may be remotely monitored and/or automatically managed or configured by NMS 130 to optimize wireless network performance on a periodic (e.g., hourly or daily) basis.

Input/output (I/O) 210 represents physical hardware components that enable interaction with a user, such as buttons, a touchscreen, a display and the like. Although not shown, memory 212 typically stores executable software for controlling a user interface with respect to input received via I/O 210.

In some examples, orchestration of RTT measurements between a plurality of APs 200 is controlled by a computing device, such as NMS 130 and/or other computing device executing RTT orchestration module 133 as shown in FIGS. 1A and 1B.

Figure 3:
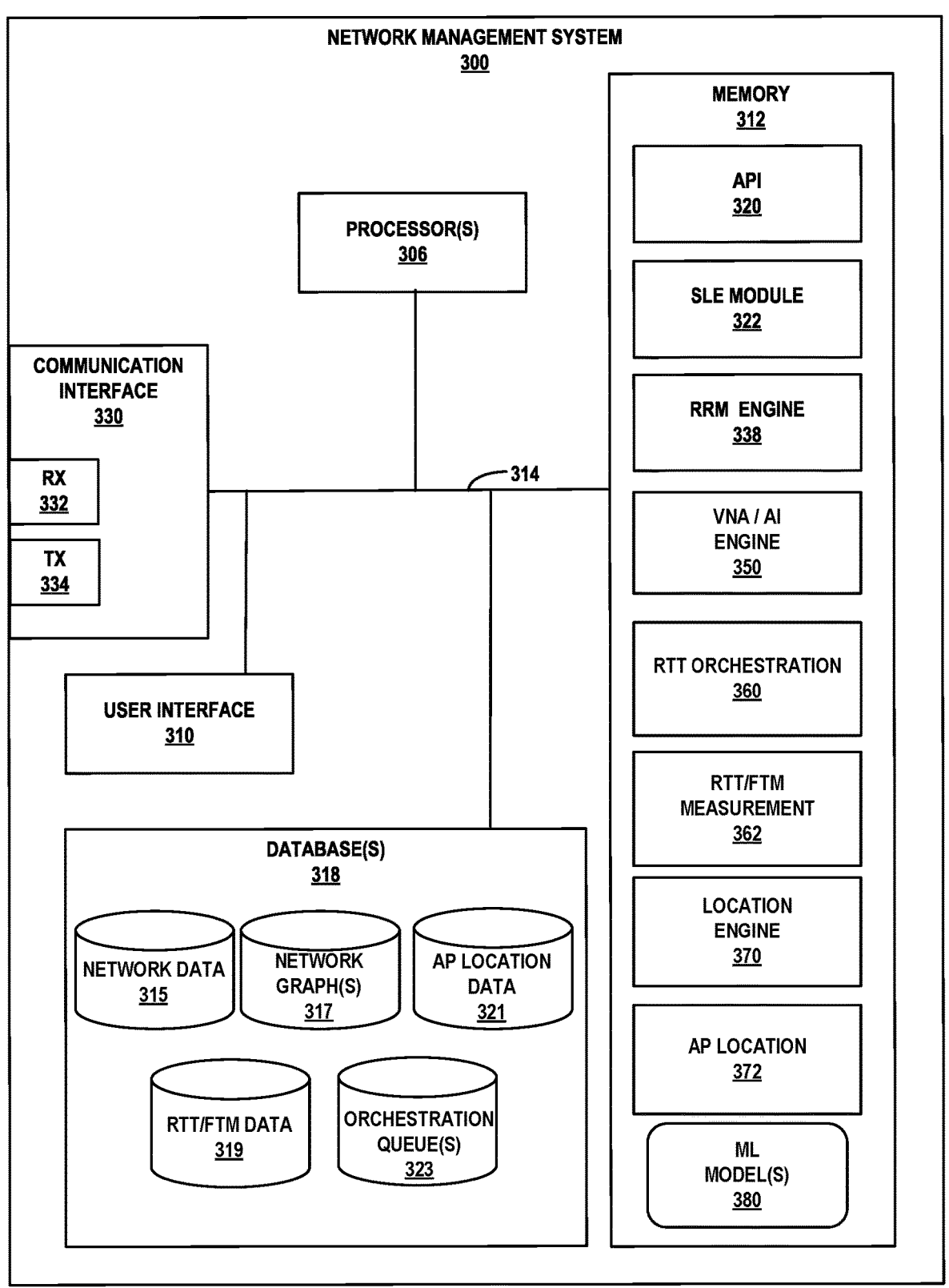
FIG. 3 is a block diagram of an example network management system configured to determine locations of deployed APs, in accordance with one or more techniques of the disclosure.

FIG. 3 is a block diagram of an example network management system (NMS) 300 configured to orchestrate RTT measurements between a plurality of devices (e.g., APs) in accordance with one or more techniques of the disclosure. NMS 300 may be used to implement, for example, NMS 130 in FIGS. 1A-1B. In such examples, NMS 300 is responsible for monitoring and management of one or more wireless networks 106A-106N at sites 102A-102N, respectively, including orchestration of RTT measurements between a plurality of devices such e.g., APs 142 of FIG. 1 or AP 200 of FIG. 2. In some examples, NMS 300 receives network data collected by APs and analyzes this data for cloud-based management of wireless networks 106A-106N. In some examples, NMS 300 may be part of another server shown in FIG. 1A or a part of any other server. NMS 300 includes a communications interface 330, one or more processor(s) 306, a user interface 310, a memory 312, and a database 318. The various elements are coupled together via a bus 314 over which the various elements may exchange data and information.

Processor(s) 306 execute software instructions, such as those used to define a software or computer program, stored to a computer-readable storage medium (such as memory 312), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 134 as shown in FIG. 1A, and/or any local area networks. Communications interface 330 includes a receiver 332 and a transmitter 334 by which NMS 300 receives/transmits data and information to/from any of AP devices 142, servers 110, 116, 122, 128 and/or any other devices or systems forming part of network 100 such as shown in FIGS. 1A-1B. The data and information received by NMS 300 may include, for example, network data and/or event log data received from access points 142 used by NMS 300 to remotely monitor and/or control the performance of wireless networks 106A-106N and to determine the locations of APs 142. NMS may further transmit data via communications interface 330 to any of network devices such as APs 142 at any of network sites 102A-102N to remotely manage wireless networks 106A-106N.

Memory 312 includes one or more devices configured to store programming modules and/or data associated with operation of NMS 300. For example, memory 312 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 312 includes an API 320, SLE module 322, a radio resource management (RRM) engine 338, a virtual network assistant (VNA)/AI engine 350, an RTT orchestration module 360, an RTT/FTM measurement module 362, a location engine 370, an AP location module 372, and one or more machine learning models 380. NMS 300 may also include any other programmed modules, software engines and/or interfaces configured for remote monitoring and management of wireless networks 106A-106N, including remote monitoring and management of any of AP devices 142.

RRM engine 338 monitors one or more metrics for each site 106A-106N in order to learn and optimize the power and/or radio-frequency (RF) environment at each site. For example, RRM engine 338 may monitor the coverage and capacity SLE metrics (e.g., managed by SLE module 322) for a wireless network 106 at a site 102 in order to identify potential issues with coverage and/or capacity in the wireless network 106 and to make adjustments to the radio settings of the access points at each site to address the identified issues. RRM engine 338 may determine channel and transmit power distribution across all AP devices 142 in each network 106A-106N. RRM engine 338 may monitor events, power, channel, bandwidth, and number of clients connected to each AP device. RRM engine 338 may measure the strength of a radio signal of client devices, such as an RSSI value. RRM engine 338 may further automatically change or update configurations of one or more AP devices 142 at a site 106 with an aim to improve the coverage and/or capacity SLE metrics and thus to provide an improved wireless experience for the user. In some examples, RRM engine 338 may use AP location information determined by AP location module 372 in order to learn and optimize the RF environment provided by the wireless network.

VNA/AI engine 350 analyzes network data received from AP devices 142 as well as its own data to monitor performance of wireless networks 106A-106N. For example, VNA engine 350 may identify when anomalous or abnormal states are encountered in one of wireless networks 106A-106N. VNA/AI engine 350 may use a root cause analysis module (not shown) to identify the root cause of any anomalous or abnormal states. In some examples, the root cause analysis module utilizes artificial intelligence-based techniques to help identify the root cause of any poor SLE metric(s) at one or more of wireless networks 106A-106N. In addition, VNA/AI engine 350 may automatically invoke one or more remedial actions intended to address the identified root cause(s) of one or more poor SLE metrics. Examples of remedial actions that may be automatically invoked by VNA/AI engine 350 may include, but are not limited to, invoking RRM engine 338 to reboot one or more AP devices and/or adjust/modify the transmit power of a specific radio in a specific AP device, adding service set identifier (SSID) configuration to a specific AP device, changing channels on an AP device or a set of AP devices, etc. The remedial actions may further include restarting a switch and/or a router, invoke downloading of new software to an AP device, switch, or router, etc. These remedial actions are given for example purposes only, and the disclosure is not limited in this respect. If automatic remedial actions are not available or do not adequately resolve the root cause, VNA/AI engine 350 may proactively and automatically provide a notification including recommended remedial actions to be taken by IT personnel to address the anomalous or abnormal wireless network operation.

SLE (service level experience) module 322 enables set up and tracking of thresholds for one or more SLE metrics for each of wireless networks 106A-106N. SLE module 322 further analyzes network data (e.g., stored as network data 316) collected by AP devices and/or UEs associated with wireless networks 106A-106N, such as any of AP devices 142 from UEs 148 in each wireless network 106A-106N. For example, AP devices 142A-1 through 142A-N collect network data from UEs 148A-1 through 148A-N currently associated with wireless network 106A (e.g., named assets, connected/unconnected Wi-Fi clients). This data, in addition to any network data collected by one or more APs 142A-1 through 142A-N in wireless network 106A, is transmitted to NMS 300 and stored as, for example, network data 315.

NMS 300 executes SLE module 322 to determine one or more SLE metrics for each UE 148 associated with a wireless network 106. One or more of the SLE metrics may further be aggregated to each AP device at a site to gain insight into contribution of each AP device to wireless network performance at the site. The SLE metrics track whether the service level for each particular SLE metric meets the configured threshold value(s). In some examples, each SLE metric may further include one or more classifiers. If a metric does not meet the configured SLE threshold value for the site, the failure may be attributed to one of the classifiers to further understand how and/or why the failure occurred.

AP location module 372, when executed by one or more processor(s) of NMS 300, automatically determines locations (e.g., coordinates) of deployed APs with respect to the location(s) of other APs in the wireless network based on the FTM distances between pairs of APs determined based on the RTT measurements obtained using the RTT orchestration techniques of the disclosure. AP location module 372 may store the determined location of each AP at the site in a database (e.g., as AP location data 321) for further monitoring and/or analysis. In addition, NMS 130 may automatically generate one or more suggestions and/or automatically invoke one or more actions based on the coordinates for one or more of the plurality of nodes. In another example, the determined AP coordinate locations are used by location engine 370 to determine the location of one or more wireless client devices associated with, e.g., communicating via, the APs.

The orchestration techniques of the disclosure reduce an amount of time to determine the distances between a plurality of wireless devices such as APs in a wireless network based on RTT measurements. Example techniques for performing fine time measurements (FTM) of distance based on round-trip time (RTT) between two APs in a wireless network has been standardized as part of the 2016 update of the IEEE 802.11 Wi-Fi standard (also referred to as IEEE 802.11mc). To perform the RTT measurements, a pair of APs is configured to operate in a specific frequency channel (e.g., channel of a frequency band) (or use a specific spreading sequence) wherein one AP acts as a transmitter and the other AP as a receiver. Once the receiving AP receives the message from the transmitting AP, it echoes it back to the original transmitter where the round-trip time (RTT) is recorded. The RTT is indicative of the distance between the two APs.

The expected accuracy is inversely proportional to the bandwidth of the wireless signal used to make the RTT measurements. To increase the accuracy of the RTT measurements, the system utilizes broad bandwidth signals, e.g., 20 MHz, 40 MHz, 80 MHz, or 160 MHz channels. This reduces the number of independent frequency bands that can be used without encountering co-channel interference between transmission signals from neighboring APs.

During the RTT measurement process, a pair of APs are dedicated to a specific communication channel e.g., frequency band, a specific spreading sequence, etc., and as such are not available to provide other wireless networking services. In some prior solutions, all of the APs in the entire network are taken out of service to perform the RTT measurements. However, this is an undesirable situation because wireless networking services are not available during the time (duration) it takes to perform the RTT measurements. In other prior solutions, a small number of APs are taken out of service at any given time and dedicated to RTT measurements. However, in such examples, because the RTT measurements take place on only a small number of APs, for a large network, the RTT measurements for the whole network may take a few days.

Data received by NMS 300 from one or more APs include RTT measurements obtained by the plurality of APs in accordance with one or more of the RTT orchestration techniques described herein. The RTT measurements may be stored in, for example, RTT/FTM data 319. RTT/FTM measurement module 362 determines a distance between a pair of APs based on a fine time measurement (FTM) of the RTT measurements obtained for the pair of APs. The FTM distance is also stored by NMS 300, for example, in RTT/FTM data 319.

In accordance with one or more techniques of the disclosure, the orchestration techniques of the disclosure reduce an amount of time to complete RTT measurements between a plurality of APs in a wireless network. It is desired to perform RTT measurements for the whole network in the shortest amount of time because during the RTT measurement neither AP can support Wi-Fi clients. What is needed is a system that can execute the RTT measurements between all of the APs at the short time (so as to minimize the downtime of the network).

Network graph(s) 317 includes one or more neighborhood graphs indicative of neighbor relationships between APs in the wireless network. For example, a neighborhood graph is constructed based on information indicative of the distances between the APs. This information may be measured information, or alternatively may be determined based on signal strength (e.g., RSSI) measurements of signals transmitted by a first AP and received by a second AP, and using this information to determine whether a signal transmitted by first AP can be received and potentially interfere with reception of signals by a second AP. In some examples, two APs are considered to be "neighbors" based on a first AP being able to receive a signal from a second AP at an RSSI that satisfies a predetermined threshold (e.g., greater than a predetermined threshold). Nodes within a network graph may represent APs in the wireless network, and edges within the network graph may represent connections between APs. A vertex within the network graph may represent a node (e.g., AP) having a connection to two or more other nodes (e.g., other APs).

As further described herein (e.g., in FIG. 6A-6B), RTT orchestration module 360 assigns identifiers to edges in the network graph that connect between a pair of APs 142. Each edge is assigned to an identifier, wherein each edge of at least two adjacent edges is assigned to a different identifier. Two edges are said to be adjacent if they are connected to the same vertex (e.g., device/AP). The identifier assigned to a device pair corresponds to the identifier assigned to their connecting edge. The NMS orchestrates the RTT measurements such that device pairs connected by edges assigned to the same identifier perform RTT measurements in parallel (e.g., simultaneous or near-simultaneous). In this way, conflicts in which the same device belonging to two or more different device pairs assigned to perform RTT measurements during a single iteration are avoided. In some examples, the parallel measurements are performed using different signals/messages over different communication channels (e.g., frequency bands). In some examples, one or more of the communication channels are reused in areas (sub-regions) of the network where it is deemed that the reuse of communication channels is unlikely to cause interference. The RTT measurements between the device pairs may be used to determine the locations of one or more devices (e.g., APs) deployed at a site. The techniques described herein may also apply to determining locations of any type of devices associated with a wireless network.

Figure 4:
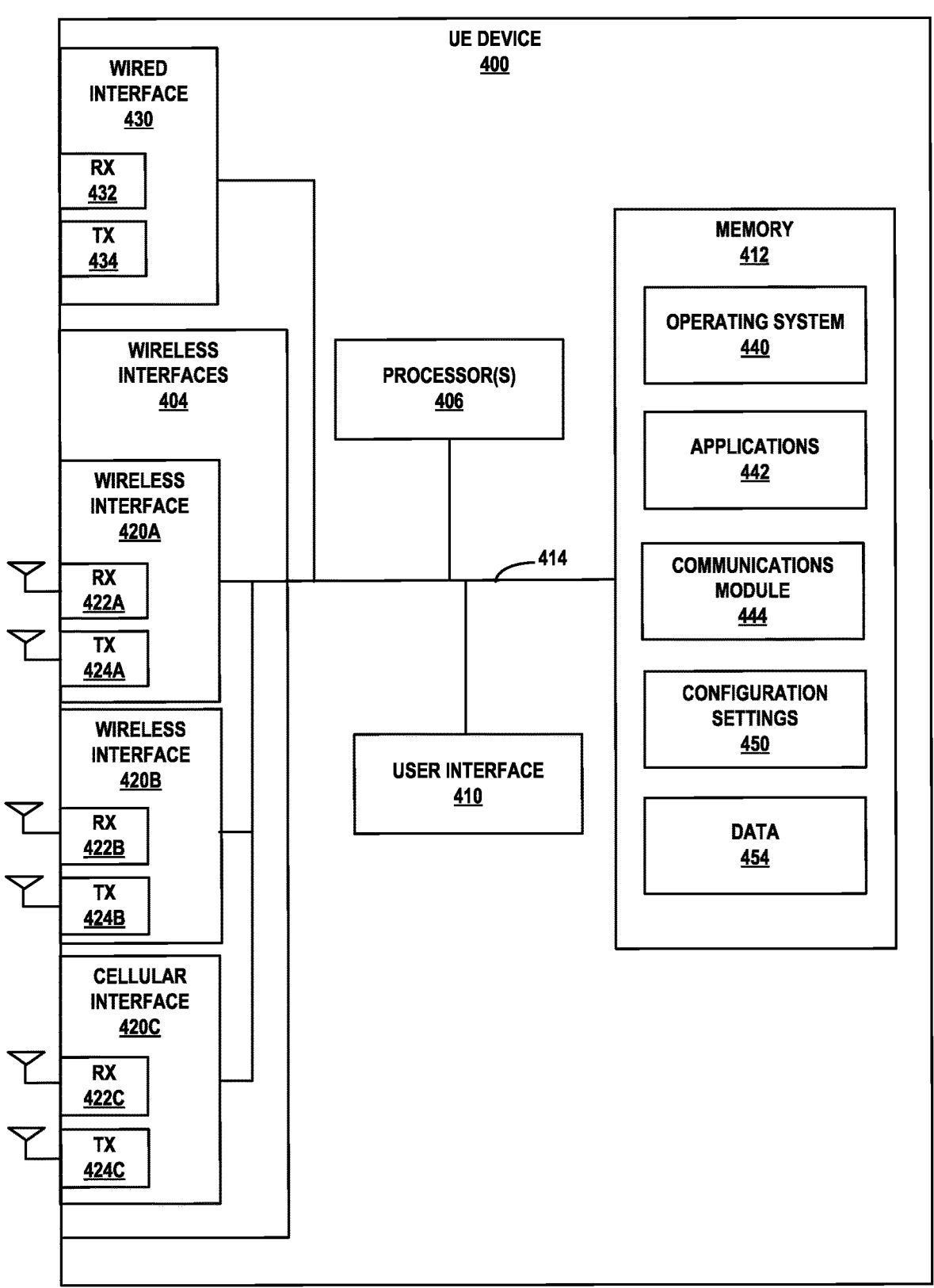
FIG. 4 is a block diagram of an example user equipment device in accordance with one or more techniques of the disclosure.

FIG. 4 shows an example user equipment (UE) device 400. Example ULE device 400 shown in FIG. 4 may be used to implement any of UEs 148 as shown and described herein with respect to FIG. 1. UE device 400 may include any type of wireless client device, and the disclosure is not limited in this respect. For example, UE device 400 may include a mobile device such as a smart phone, tablet or laptop computer, a personal digital assistant (PDA), a wireless terminal, a smart watch, a smart ring or any other type of mobile or wearable device. UE 400 may also include any type of IoT client device such as a printer, a security sensor or device, an environmental sensor, or any other connected device configured to communicate over one or more wireless networks.

NMS 130 receives relevant network data from UEs 148 on a continuous basis (e.g., every 2 seconds or other appropriate time period). The network data 454 may include, for example, RSSI measurements of one or more wireless signals received from one or more AP devices by UE 400 as measured by the AP devices.

UE device 400 includes a wired interface 430, wireless interfaces 420A-420C, one or more processor(s) 406, memory 412, and a user interface 410. The various elements are coupled together via a bus 414 over which the various elements may exchange data and information. Wired interface 430 includes a receiver 432 and a transmitter 434. Wired interface 430 may be used, if desired, to couple UE 400 to network(s) 134 of FIG. 1. Wireless interfaces 420A, 420B, and 420C include receivers 422A, 422B, and 422C, respectively, each including a receive antenna via which UE 400 may receive wireless signals from wireless communications devices, such as AP devices 142 of FIG. 1, AP device 200 of FIG. 2, other UEs 148, or other devices configured for wireless communication. Wireless interfaces 420A, 420B, and 420C further include transmitters 424A, 424B, and 424C, respectively, each including transmit antennas via which UE 400 may transmit wireless signals to wireless communications devices, such as AP devices 142 of FIG. 1, AP device 200 of FIG. 2, other UEs 148 and/or other devices configured for wireless communication. In some examples, wireless interfaces 404 may include different types of interfaces. For example, wireless interface 420A may include a Wi-Fi 802.11 interface (e.g., 2.4 GHz and/or 5 GHz), wireless interface 420B may include a Bluetooth interface and/or a Bluetooth Low Energy interface, and wireless interface 420C may include a cellular interface through which UE device 400 may connect to a cellular network.

Processor(s) 406 execute software instructions, such as those used to define a software or computer program, stored to a computer-readable storage medium (such as memory 412), such as non-transitory computer-readable mediums including a storage device (e.g., a disk drive, or an optical drive) or a memory (such as Flash memory or RAM) or any other type of volatile or non-volatile memory, that stores instructions to cause the one or more processors 406 to perform the techniques described herein.

Memory 412 includes one or more devices configured to store programming modules and/or data associated with operation of UE 400. For example, memory 412 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 406 to perform the techniques described herein.

In this example, memory 412 includes an operating system 440, applications 442, a communications module 444, configuration settings 450, and data storage for network data 454. Data storage for network data 454 may include, for example, a status/error log including network data specific to UE 400. As described above, network data 454 may include any network data, events, and/or states that may be related to determination of one or more roaming quality assessments. The network data may include event data such as a log of normal events and error events according to a logging level based on instructions from the network management system (e.g., NMS 130/300). Data storage for network data 454 may store any data used and/or generated by UE 400, such as network data used to determine proximity to a proximity zone, that is collected by UE 400 and transmitted to any of AP devices 142 in a wireless network 106 for further transmission to NMS 130.

Communications module 444 includes program code that, when executed by processor(s) 406, enables UE 400 to communicate using any of wired interface(s) 430, wireless interfaces 420A-420B and/or cellular interface 420C. Configuration settings 450 include any device settings for UE 400 for each of wireless interface(s) 420A-420B and/or cellular interface 420C.

Alternatively, or in addition, in some examples, UE 400 may be configured to participate in a message exchange with another wireless device such as another AP to facilitate RTT measurements used to facilitate determining the distance between the UE and one or more APs, resulting in determination of the location of the UE.

Figure 5:
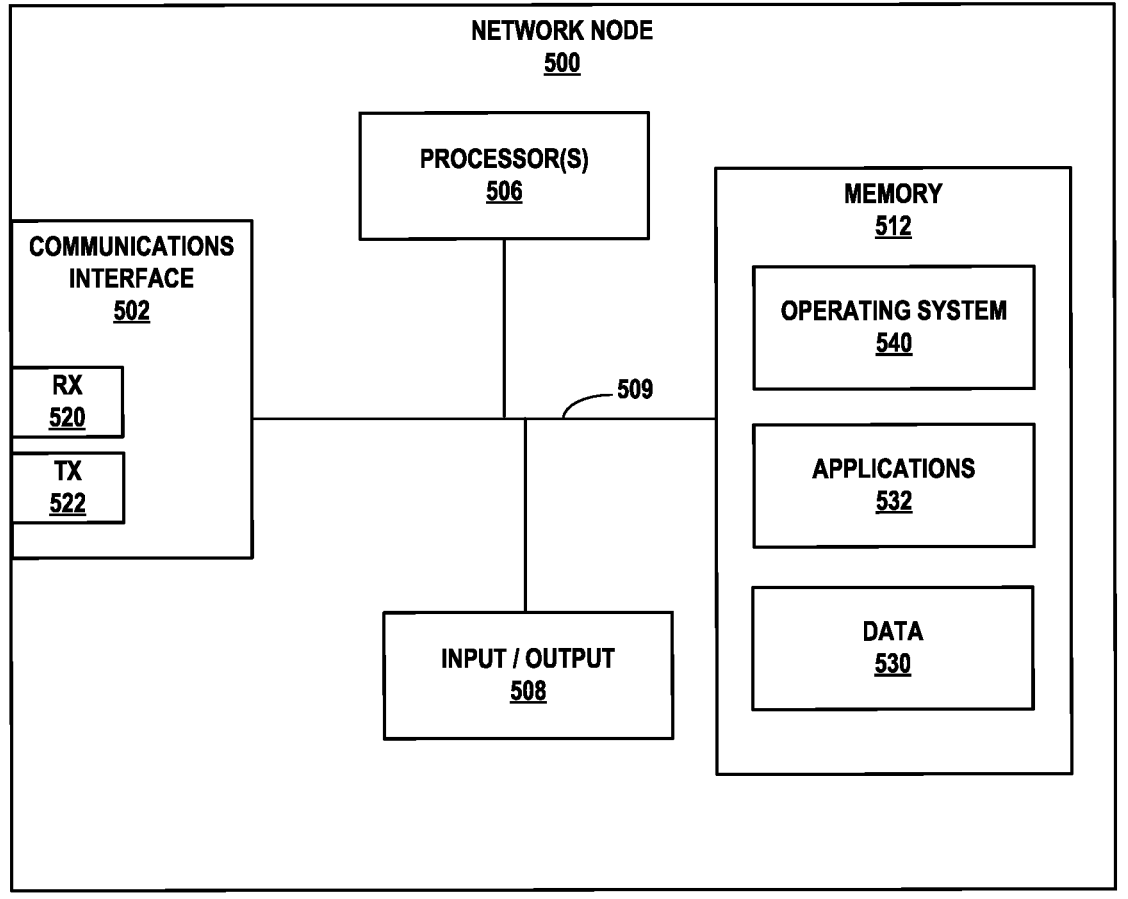
FIG. 5 is a block diagram of an example network node, such as a router or switch, in accordance with one or more techniques of the disclosure.

FIG. 5 is a block diagram illustrating an example network node 500 configured according to the techniques described herein. In one or more examples, the network node 500 implements a device or a server attached to the network 134 of FIG. 1, e.g., router, switch, AAA server 110, DHCP server 116, DNS server 122, VNA 133, web server 128A-128X, etc., or any other network device.

In this example, network node 500 includes a communications interface 502 (e.g., an Ethernet interface), one or more processor(s) 506, input/output 508 (e.g., display, buttons, keyboard, keypad, touch screen, mouse, etc.), a memory 512, and an assembly of components (e.g., assembly of hardware module(s), assembly of circuits, etc.) coupled together via a bus 509 over which the various elements may interchange data and information. Communications interface 502 couples the network node 500 to a network (e.g., network 134 of FIG. 1), such as an enterprise network.

Though only one interface is shown by way of example, those skilled in the art should recognize that network nodes may have multiple communication interfaces. Communications interface 502 includes a receiver 520 via which the network node 500 can receive data and information (e.g., including data indicative of distances between APs, and/or operation related information such as registration request, AAA services, DHCP requests, Simple Notification Service (SNS) look-ups, and web page requests). Communications interface 502 includes a transmitter 522, via which the network node 500 can send data and information (e.g., including location information, configuration information, authentication information, web page data, etc.).

Memory 512 stores executable software applications 532, operating system 540 and data/information 530. Data 530 includes system log and/or error log that stores network data and/or proximity information for network node 500 and/or other devices, such as wireless access points, based on a logging level according to instructions from the network management system. Network node 500 may, in some examples, forward the network data to a network management system (e.g., NMS 130 of FIG. 1) for analysis as described herein.

Figure 6A:
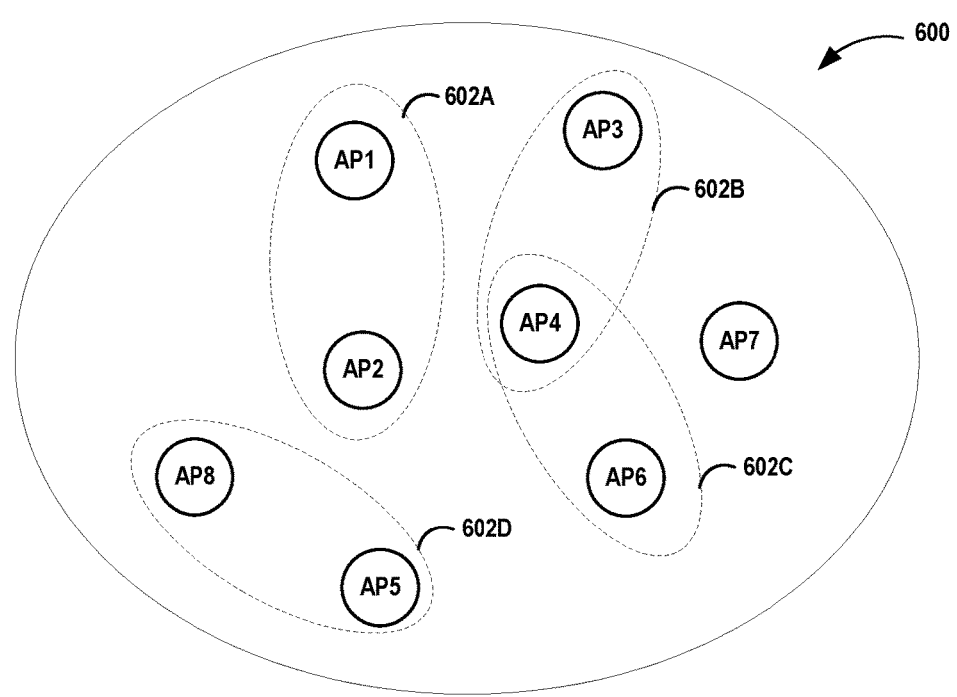
FIG. 6A shows an example network graph and FIG. 6B shows an example of randomly assigning RTT measurements to AP pairs of the AP network of FIG. 6A.

FIG. 6A is a diagram of an example Wi-Fi network 600 including eight APs, AP1 -AP8. Some of the AP pairs are shown via dashed lines. For example, AP pair 602A includes API and AP2. AP pair 602B includes AP3 and AP4. AP pair 602C includes AP4 and AP6. In a network of NAPs, there are (N*(N−1))/2 pairs of APs. Thus, the total number of AP pairs for an eight-node network such as that shown in FIG. 6A is (8*7)/2=28 AP pairs. In a typical wireless network implementation, each AP is confined to using a specific single frequency (or a specific spreading sequence) at any given time. RTT measurements between AP1-AP2 can take place at a specific time. However, because AP4 is a member of both AP pairs 602B and 602C, AP measurements between AP pairs AP3-AP4 and AP4-AP6 cannot be performed at the same time and the transmission of the RTT signals between these two AP pairs may collide and interfere with each other. Similarly, any time two different AP pairs share a same node (e.g., vertex), the RTT measurements of those AP pairs may not be performed simultaneously without the risk of co-channel interference.

For a larger network of 200 nodes, for example, the equation above yields a total of 19,900 AP pairs. To measure the distances between all AP pairs in such a network would therefore require 19,900 RTT measurements. Given the fact that it takes about 1035 milliseconds to perform a single RTT measurement, performing the measurements serially to avoid conflicts would require more than five and a half hours during which the network may need to be taken out of service to facilitate the RTT measurements. As further described below, the NMS (e.g., NMS 134 of FIG. 1) assigns identifiers to edges in a network graph that connect between AP pairs 602B (e.g., AP3-AP4) and 602C (e.g., AP4-AP6). As edges that connect AP pairs AP3-AP4 and AP4-AP6 are adjacent, the NMS assigns different identifiers to each of the edges. The NMS orchestrates the RTT measurements such that AP pairs connected by edges assigned to the same identifier (e.g., AP pairs 602A, 602B, and 602D) perform RTT measurements in parallel and edges assigned to different identifiers (e.g., AP pairs 602B and 602C) do not perform RTT measurements during a single iteration.

Figure 6B:
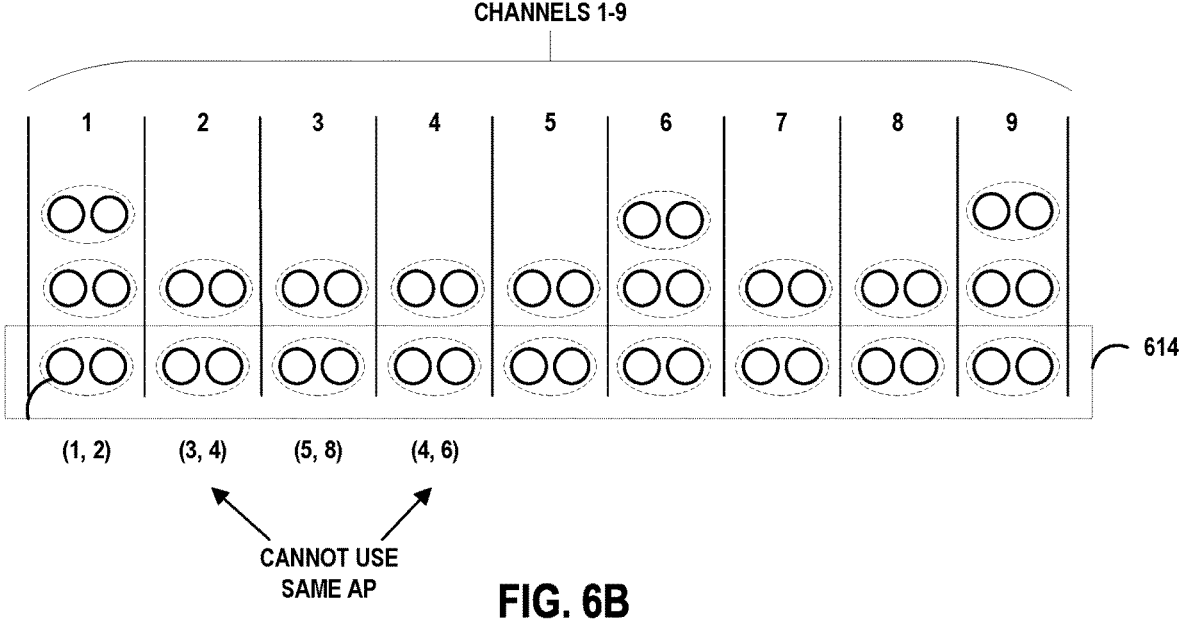

FIG. 6B illustrates an example of randomly assigning RTT measurements to AP pairs of the eight AP network of FIG. 6A using 9 non-dynamic frequency selection (non-DFS) (non-overlapping communication channels) frequency bands. In FIG. 6B, the 9 non-DFS frequency bands are assigned randomly to AP pairs; that is, AP pairs are randomly selected and divided into groups that include 9 AP pairs each. Each group is represented by a row. The first group 614 to be executed in this example is represented by the bottom row in the figure. In this example, a random selection of AP pairs selected the pairs AP3-AP4 and AP4-AP6 as members in the first AP pair group 614. This selection is not viable because AP4 cannot operate in two different communication channels, e.g., frequency bands at the same time. One can of course replace one of these pairs and select another pair instead. However, while this is possible to do in the first iteration (random selection of the first group 614 of APs), the random selection of AP pairs may result in a similar conflict with succeeding iterations and, towards the end, the freedom of AP pair selection is greatly limited. In the extreme case, during each successive iteration, AP pair group selection may have to use only limited number of frequency bands in each iteration resulting in a prolonged measurement time. Specifically, if one were to select the AP pairs randomly, the last group of this random selection may end up including the pairs AP1-AP2, AP1-AP3, AP1-AP4, AP1-AP5, AP1 -AP6, AP1-AP7, AP1-AP8, AP1-AP9, the last 8 AP pairs in the randomly selected group may require eight different iterations for each individual pair, thus greatly increasing the time it would take for the measurements to complete.

In accordance with one or more techniques of the disclosure, a computing device assigns identifiers to the edges in a network graph (e.g., connections between nodes in a network graph) of the plurality of wireless devices (e.g., APs or other wireless device) such that no two adjacent edges are assigned to the same identifier. In some examples, the identifiers are assigned utilizing graph edge coloring techniques. For purposes of the present description, examples in which the edges are assigned to "colors" will be described; however, any identifier may be used, and the disclosure is not limited in this respect.

Figure 7A:
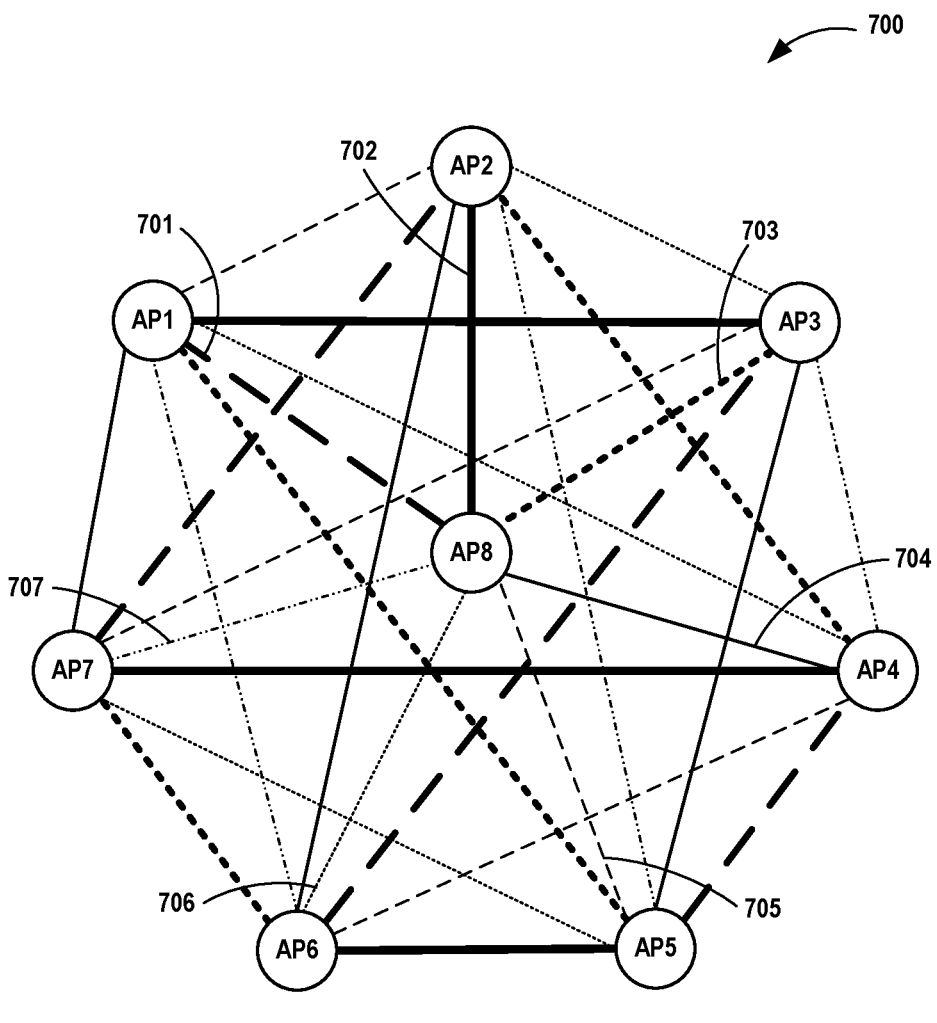
FIG. 7A shows an example edge colored graph of eight APs in accordance with one or more techniques of the disclosure.

FIG. 7A shows an example edge colored graph 700 of eight APs, AP1-AP8 in accordance with one or more techniques of the disclosure. A computing device assigns "colors" (or other identifier such as differently dashed lines in the figure including but not limited to tag, label, number, etc.) to the edges of the graph so that no two adjacent edges have the same color with an optimal number of colors. Two edges are said to be adjacent if they are connected to the same vertex (node) in the graph. A complete graph (an undirected graph where each pair of nodes is connected by one unique edge) with Nnodes can be colored with (N−1) colors while maintaining the condition that edges with the same color do not have any common nodes. In the example of FIG. 7A, example graph 700 having eight nodes can be colored with (8-1)=7 colors. The N different colors, in this example, seven colors including purple (e.g., edge 701), pink (e.g., edge 702), red (e.g., edge 703), orange (e.g., edge 704), yellow (e.g., edge 705), green (e.g., edge 706) and blue (e.g., edge 707), are represented by differently dashed lines and/or thickness as shown in the legend for FIG. 7A. In some examples, for purposes of edge coloring the graph, one node is selected as a center node. In the example of FIG. 7A, node AP8 has been selected as the center node; however, any node may be selected as the center node, and the disclosure is not limited in this respect. In some examples, the center node is used in the process of dividing the pairs of nodes into sub-groups (e.g., sub-regions of colors).

In accordance with one or more techniques of the disclosure, edge coloring of a network graph including a plurality of APs is used as a basis to orchestrate (e.g., schedule) RTT measurements between the plurality of APs in a wireless network. RTT measurements for AP pairs connected by an edge assigned to the same color are performed in parallel using different communication channels. For example, a computing device (e.g., NMS 130/300 or other computing device executing RTT orchestration module 133/360) assigns each edge (e.g., connection between an AP pair) in a graph of N APs to one of (N−1) colors according to an edge coloring algorithm such that no two adjacent edges are assigned to the same color. The computing device assigns each AP pair to one of the (N−1) colors based on the color of the edge connecting the two APs in the AP pair. During each RTT measurement iteration, the orchestrating computing device causes the APs to perform parallel RTT measurements of AP pairs connected by edges assigned to the same color. Because no two adjacent edges are assigned to the same color, conflicts in which one AP is assigned to two AP pairs during the same iteration are avoided. In some examples, the parallel RTT measurements are performed using different signals/messages over different communication channels such as frequency bands, spreading sequence, etc. In some examples, some or all of the frequency bands are reused in one or more sub-regions of the network where it is deemed that the reuse of frequency bands would not cause interference.

(N−1) colors may be assigned to the edges of a complete graph having Nnodes in any number of ways. For example, Soifer, Alexander (2008) "The Mathematical Coloring Book" Springer-Verlag, ISBN 978-0-387-74640-1, provides a method for dividing a graph into groups of pairs: place n points at the vertices and center of a regular (n−1)-sided polygon. For each color class, include one edge from the center to one of the polygon vertices, and all of the perpendicular edges connecting pairs of polygon vertices. However, when n is odd, n colors are needed: each color can only be used for (n−1)/2 edges, a 1/n fraction of the total.

Although a specific example equation/algorithm for edge coloring of a graph is described herein, this is described for example purposes only and other equations/algorithms for edge coloring of a graph may be used, and the disclosure is not limited in this respect.

Figure 7B:
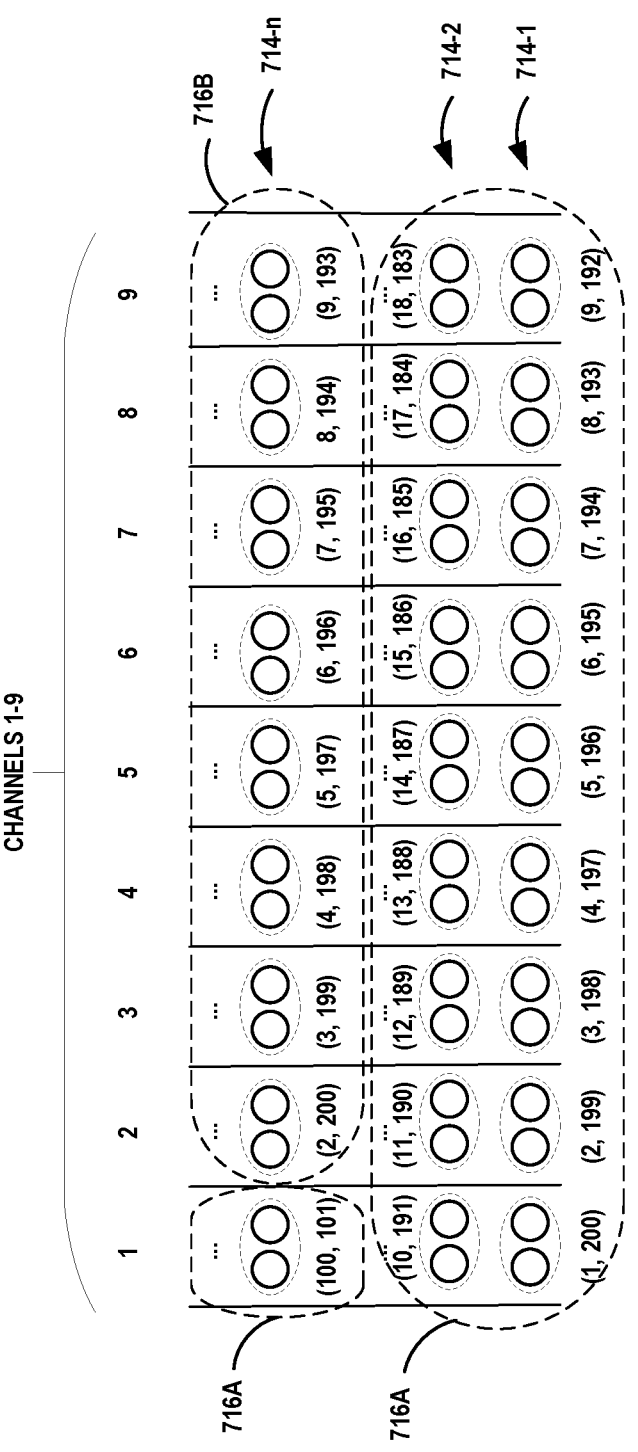
FIG. 7B illustrates orchestration of RTT measurements using 9 non-DFS channels in parallel in accordance with one or more techniques of the disclosure.

FIG. 7B illustrates an example of orchestration of RTT measurements using 9 non-DFS channels in parallel in accordance with one or more techniques of the disclosure. Using the example of a Wi-Fi network with 200 APs, the 19900 AP pairs can be assigned to 199 identifiers (e.g., colors) wherein each color includes 100 AP pairs. In this example, a computing device (e.g., NMS 130/300 or other computing device executing RTT orchestration module 133/360) uses 9 frequency bands to send 9 different RTT measurement messages between AP pairs assigned to the same color in parallel. In an example network with 200 APs, 12 iterations (e.g., determined from 100 AP pairs/9 frequency bands=11.11) are needed to complete RTT measurements for all of the AP pairs assigned to a single color. Since processing one iteration takes approximately 1035 milliseconds, the process of measuring the RTT for all of the 199 colors in the wireless network takes approximately 12*1035*199/60≈41 minutes to process RTT measurements of the whole site. This is compared to the over five and half hours in the example described above where only one RTT measurement between one of the 100 AP pairs is performed in each iteration.

For example, in a first iteration 714-1 represented in the first (bottom) row of FIG. 7B, parallel RTT measurements may be performed between a first group of AP pairs assigned to a first color as indicated by reference numeral 716A, in this example AP pairs AP1-AP200, AP2-AP199, AP3-AP198, AP4-AP197, AP5-AP196, AP6-AP195, AP7-AP194, AP8-AP193, and AP9-AP192. Because there are still AP pairs remaining in the first color, a second iteration 714-2 may include, for example, parallel RTT measurements performed between AP pairs AP10-AP191, AP11-AP190, etc. As mentioned above, for a network including 200 APs, 12 iterations may be needed if RTT measurements for every possible AP pair assigned to the first color are to be performed. During a last iteration 714-n (where n=12 in this example) for the AP pairs assigned to the first color 716A, an RTT measurement is performed between AP pair AP100-AP101. Once the RTT measurements between AP pairs assigned to the first color (e.g., the group of device pairs 716A) are completed, the RTT measurements for AP pairs assigned to the next color (e.g., as indicated by reference numeral 716B) may be performed until the RTT measurements for all colors are complete.

In some examples, such as that shown in FIG. 7B, if there are unused communication channels that are not assigned to an AP pair during a last iteration of a current color (such as color 716A in iteration 714-n), AP pairs from the next selected color (e.g., as indicated by color 716B) are assigned to those communication channels during the same iteration. In these examples, the efficiency gained by using all of the communication channels during each iteration outweighs the low likelihood of a conflict between AP pairs assigned to the current selected color and AP pairs assigned to the next selected color. Alternatively, the AP pair(s) from the next color are selected to ensure that none of the APs in the first color is a member of the selected AP pairs of the second color. In some examples, the remaining communication channels (in this example, channels 2-9) are not used during the last iteration of AP pairs assigned to the current color. Once again it shall be understood that the number of APs and the specific assignment of colors to the APs pairs in FIG. 7B is for example purposes only, and the disclosure is not limited in this respect.

In accordance with one or more techniques of the disclosure, the computing device may further construct a neighborhood graph of the wireless network to determine which APs are "neighbors" of each other. In general, the neighborhood graph is a different graph of the network than the edge colored graph. Two APs/nodes are considered to be neighbors if a message sent from the first AP arrives at the second AP with sufficient power so that it can be decoded. In some examples, a neighborhood graph of a wireless network may be constructed based on received signal strength (RSSI) measurements of signals communicated between AP pairs; however, any method of determining neighbor relationships between APs may be used, and the disclosure is not limited in this respect.

In some examples, to orchestrate the RTT measurements, the computing device creates a list or queue of each combination of AP pairs based on the colors assigned to their connecting edges. In some examples, the computing device checks each AP pair against one or more criteria to trim or pair down the total number of AP pairs for which RTT measurements are to be performed. For example, any AP pairs that are not neighbors, as indicated by the neighborhood graph, are assumed to be too far away from each other and as such may be deleted from a list of AP pairs for which RTT measurements are to be performed or otherwise not considered when performing RTT measurements. Alternatively, when creating a list, the computing device adds an AP pair to the list of AP pairs for which RTT measurements are to be performed in response to a determination that the two APs of the AP pair are neighbors in the neighborhood graph. This eliminates the need to attempt RTT measurements for AP pairs that are not neighbors, since the signals on which the RTT measurements are based may be too weak to facilitate reliable communication between the APs. As another example, the computing device eliminates AP pairs including a virtual AP from a list of AP pairs for RTT measurements are to be performed. As another example, the computing device may eliminate AP pairs for which a distance between the two APs of the AP pair exceeds a threshold distance. By checking each AP pair against one or more criteria, the speed at which RTT measurements for the entire network may be completed is enhanced by decreasing the total number of RTT measurements needed to obtain meaningful RTT measurements for the network as a whole. In general, it shall be understood that the determination as to whether RTT measurements should be performed for a particular AP pair may be determined at any time, and the disclosure is not limited in this respect.

Figure 7C:
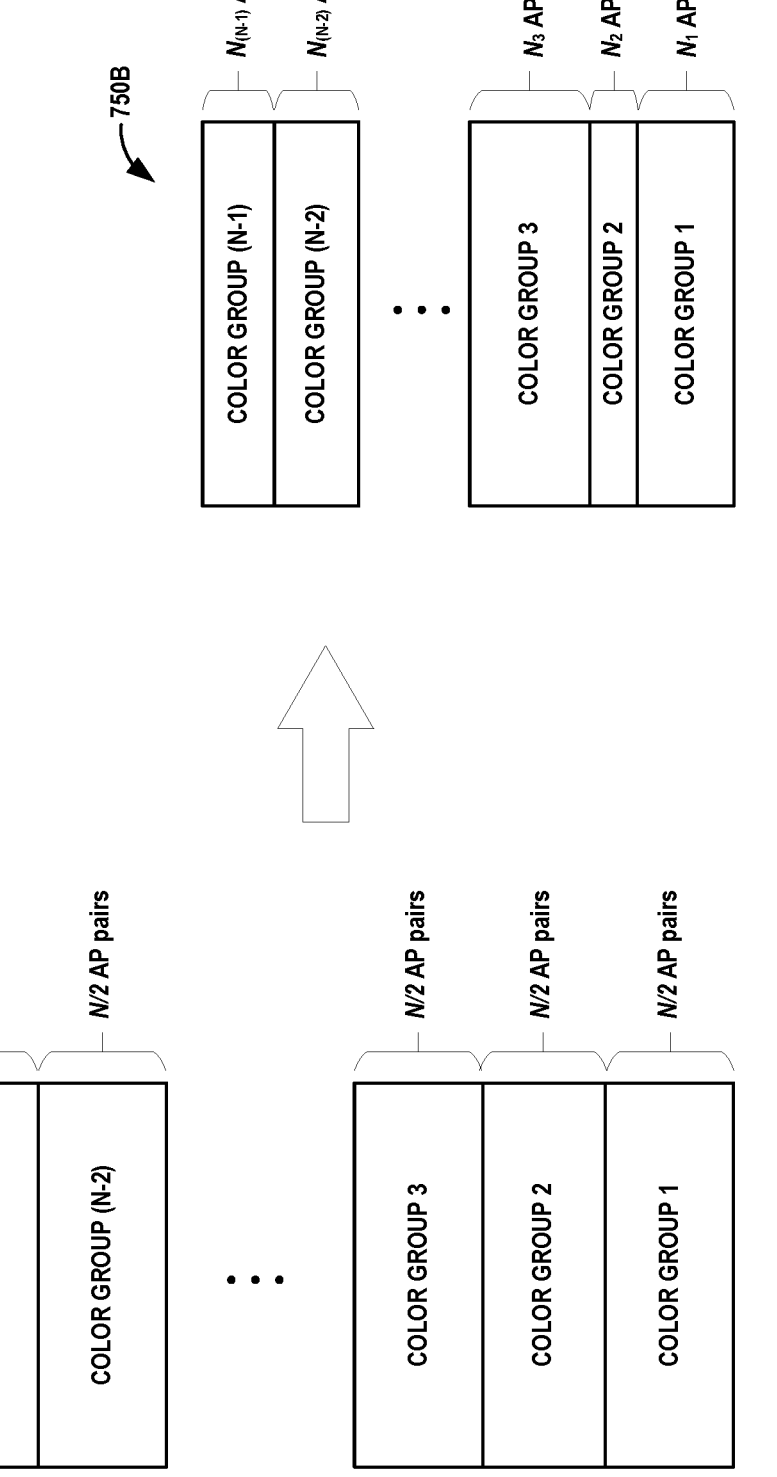
FIG. 7C show diagrams of example orchestration queues in accordance with one or more techniques of the disclosure.

FIG. 7C show representations of example orchestration queues 750A and 750B in accordance with one or more techniques of the disclosure. As described above, a computing device (e.g., NMS 130/300 or other computing device executing RTT orchestration module 133/360) assigns each edge in a graph of NAPs to one of (N−1) colors according to an edge coloring algorithm such that no two adjacent edges are assigned to the same color. The computing device assigns each AP pair to one of the (N−1) colors based on the color of the edge connecting the two APs in the AP pair. In some examples, the computing device creates a list or queue of the (N*(N−1))/2 AP pairs based on the assigned colors. Example orchestration queue 750A includes a list of (N*(N−1))/2 pairs of APs organized by color. In this example, the (N/2) AP pairs assigned to a first color are first in the queue, the (N/2) AP pairs assigned to a second color are next in the queue, etc., and the (N/2) AP pairs assigned to an (N−1) color are last in the queue. To orchestrate the RTT measurements, the computing device assigns channels to the AP pairs in an order determined by the orchestration queue such that RTT measurements for AP pairs assigned to the same color are performed in parallel. For example, assuming there are M channels available to perform RTT measurements, during a first iteration, the computing device obtains the first number of AP pairs corresponding to the M channels (referred to herein as "M AP pairs") from the orchestration queue assigned to a first color, assigns the M channels to the M AP pairs and configures the M AP pairs to perform parallel RTT measurements using the M assigned channels. During each successive iteration, the computing device proceeds through the queue, continuing to obtain the next MAP pairs from the queue assigned to a current color, assign the M channels to the current MAP pairs and configuring those MAP pairs to perform parallel RTT measurements using the M assigned channels.

In some examples, the computing device may trim or delete some of the AP pairs from the orchestration queue. Alternatively, AP pairs meeting certain conditions are not added to the orchestration queue during creation of the orchestration queue. In such examples, the deleted AP pairs will not perform a corresponding RTT measurement. As one example, the computing device may remove AP pairs from the orchestration queue that include a virtual AP (e.g., an AP added to the network graph such that the network graph includes an even number of APs as described herein below). As another example, the computing device may remove AP pairs that are not neighbors as indicated by a neighborhood graph. As another example, the computing device may remove AP pairs from the orchestration queue based on a distance between the two APs in the AP pair. For example, the computing device may determine a distance between the two APs based on the signal strength (e.g., RSSI) value used to build the neighborhood graph with a threshold distance. If the distance between the two APs exceeds the threshold distance, that AP pair is removed from the orchestration queue.

Example orchestration queue 750B includes a list of AP pairs after the list of $(N*(N\ 1))/2$ pairs of AP pairs in orchestration queue 750A has been trimmed using the one or more of the techniques described above. Alternatively, rather than deleting AP pairs from the orchestration queue, the AP pairs meeting one or more of the described conditions are not added to the orchestration queue to begin with.

Each of the (N–1) colors in orchestration queue 750 includes an associated number of AP pairs. For example, whereas each of the (N–1) colors in orchestration queue 750A includes N/2 AP pairs, each color of the (N–1) colors in orchestration queue 750B an associated number of AP pairs. For example, a first color (e.g., color 1) includes N1 AP pairs, color 2 includes N2 AP pairs, etc. and color (N–1) includes N(N–1) AP pairs. The number of AP pairs assigned to each color in orchestration queue 750 is less than or equal to N/2 (e.g., the total possible number of AP pairs assigned to each color). The total number of AP pairs in orchestration queue 750B is less than (or equal) the total number of AP pairs in orchestration queue 750A. Thus, the RTT measurements using orchestration queue 750B will take fewer iterations than the RTT measurements using orchestration queue 750A. As a result, the amount of time required to obtain meaningful RTT measurements for the network as a whole is reduced.

The orchestration queue or queues may be implemented using, for example, one or more array(s), one or more stack(s), one or more linked list(s), or any other data structure(s) that may be used to store a representation of an orchestration queue or queues. The orchestration queue(s) may be stored as, for example, part of network graph data 138/317 as shown in FIGS. 1A, 1B and 3. In other examples, rather than use orchestration queue or queues, the system uses the algorithm described above to determine and select the pairs of devices to be used for the RTT measurements in real time without utilizing orchestration queue or queues.

In accordance with one or more techniques of the disclosure, the neighborhood graph may be used to identify segments of the network (e.g., sub-regions) which are located far away from each other and as such the same communication channel (e.g., frequency band) can be used in parallel in the identified segments with a low likelihood of causing interference between the signals. The communication channels are re-used between these remotely located network segments to accelerate the RTT measurement process for the entire network.

Figure 8A:
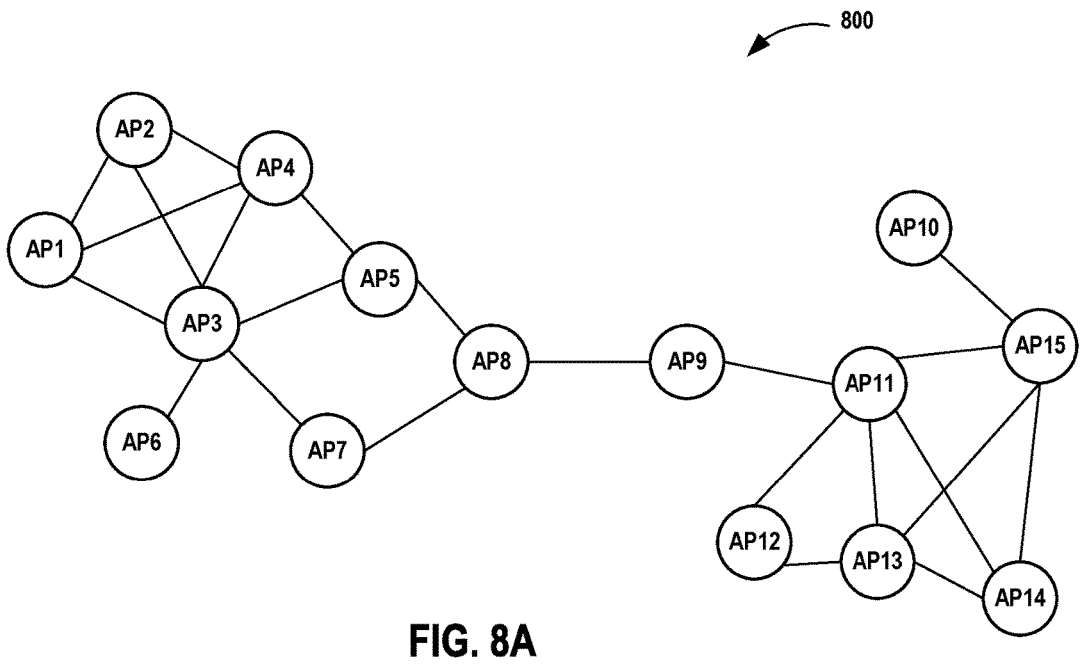
FIGS. 8A and 8B are neighborhood graphs of an example network divided into two sub-regions in accordance with one or more techniques of the disclosure.
Figure 8B:
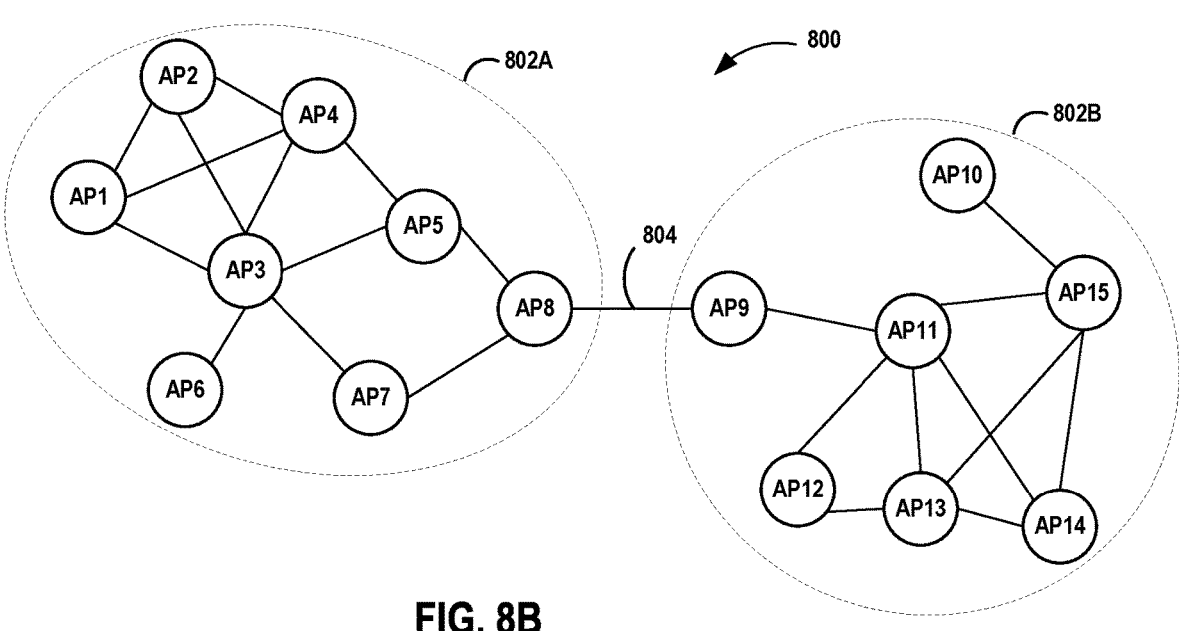

FIGS. 8A and 8B are neighborhood graphs of an example network 800 (FIG. 8A) and network 800 divided into two sub-regions 802A and 802B (FIG. 8B) in accordance with one or more techniques of the disclosure. Example network 800 includes fifteen APs, AP1 -AP15 connected with a plurality of edges, such as connection 804. Network 800 may further include additional APs and connections between those additional APs that are not shown in FIGS. 8A and 8B for purposes of clarity. In some examples, a computing device (such as NMS 130/300 or other computing device executing RTT orchestration module 133/360) divides a network graph into two or more sub-regions based on neighbor relationships between the APs. A sub-region of the network is a collection of APs that can be effectively isolated from the rest of the global network because, due to one or more features of the network, it can be assumed the same frequency bands can be used in each of the sub-regions in parallel without any concern for co-channel interference. For example, by disabling one or more connections between the sub-regions, it can be assumed that APs in different sub-regions cannot "hear" each other, and that thus the same frequency bands can be used to perform RTT measurements in each of the sub-regions without concern for co-channel interference.

For example, as shown in FIG. 8B, network 800 can be divided into two sub-regions 802A and 802B by disabling connection 804 between AP8 and AP9. Based on the neighborhood graph of network 800, it can be determined that if the connection between AP8 and AP9 is disabled (e.g., by not using AP8 or AP9 for transmission), sub-regions 802A and 802B are effectively isolated from each other. It can therefore be assumed that the group of APs, AP1-AP7, in sub-region 802A and the group of APs, AP9-AP15, in sub-region 802B, or alternatively the group of APs, AP1-AP8, in sub-region 802A and the group of APs, AP10-AP15, in sub-region 802B, cannot "hear" each other. In this way, the group of AP1 -AP7 in sub-region 802A and APs AP9-AP15 in sub-region 802B, or alternatively the group of AP1-AP8 in sub-region 802A and the group of APs AP10-AP15 in sub-region 802B, can perform RTT measurements in sub-regions 802A and 802B, respectively, in parallel using the same frequency bands without any concern for co-channel interference.

Figure 8C:
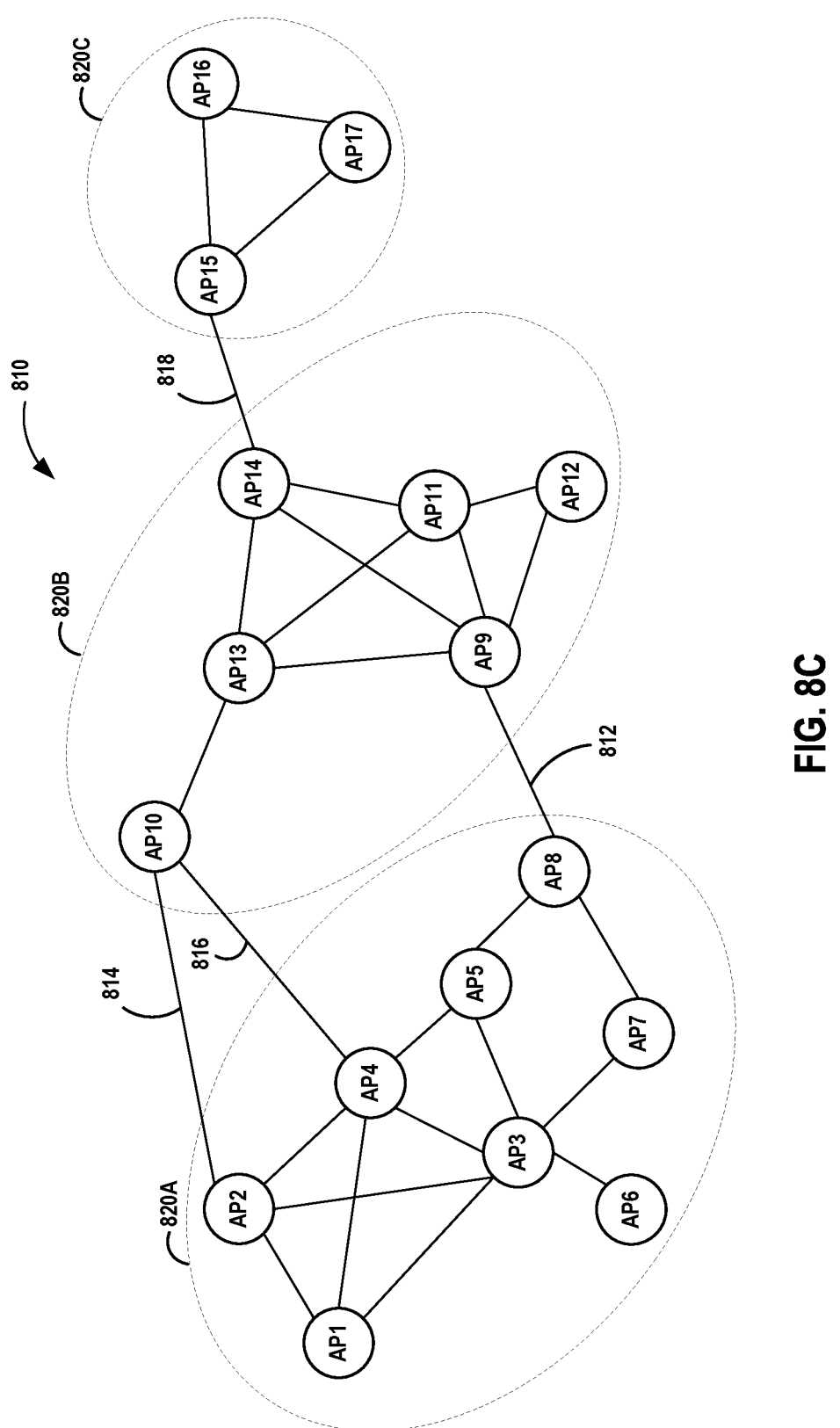
FIG. 8C is a neighborhood graph of an example network divided into three sub-regions in accordance with one or more techniques of the disclosure.

As another example, FIG. 8C is a neighborhood graph of an example network 810 divided into three sub-regions, sub-region 820A including AP1-AP8, sub-region 820B including AP10-AP14, and sub-region 820C including AP15-AP17. Network 810 may further include additional APs and connections between those additional APs that are not shown in FIG. 8C for purposes of clarity. To split the graph into the three sub-regions, connections 812, 814 and 816 between sub-regions 820A and 820B are disabled, as is connection 818 between sub-regions 820B and 820C. In this way, in this example, the AP1 -AP7, AP9 and AP11-AP14, and AP16-AP17 can perform RTT measurements in sub-regions 820A, 820B, and 820C, respectively, in parallel using the same frequency bands without any concern for co-channel interference. For sake of simplicity only one out of numerous possible implementations for disabling the connections 812, 814, 816, and 818 is described. By creating sub-regions having a reduced number of APs, the total number of colors needed to edge color the graph of each sub-region is reduced as compared to the number of colors need to edge color the graph of the network as a whole. This in turn reduces the total number of iterations needed to perform RTT measurements for the network as a whole, as well as facilitates parallel reuse of the same communication channel, e.g., frequency band, spreading sequence, etc., by different sub-regions, thus increasing the speed with which RTT measurements for the entire network can be obtained and with minimal effect on network performance. RTT measurements for connections 812, 814, 816 and 818 can be performed either before or after the iterations during the RTT measurements in sub-regions 820A, 820B and 820C are performed.

As another example, assume a system that has three different frequency bands and that the network consists of 200 APs. Further assume that the network can be split into two sub-regions of 100 APs each by disabling some of the neighborhood connections between the sub-regions. In this example, the number of nodes in each sub-region is reduced by half (from 200 nodes in the whole network to 100 nodes in each sub-region). By splitting the graph into sub-regions having a reduced number of APs, the total number of colors needed to edge color the graph of each sub-region is reduced. This in turn reduces the total number of RTT measurement iterations that need to be performed in order to obtain RTT measurements for the network as a whole. Because APs in the two sub-regions cannot hear each other, the three frequency bands can be used simultaneously (e.g., in parallel) in each sub-region; that is, the three frequency bands can be used in parallel in the first sub-region and in parallel in the second sub-region. The RTT measurements for the disabled connections may be performed either before or after the RTT measurements in each sub-region. In this example, where the network is divided into two substantially equal sub-regions, the amount of time needed to perform the RTT measurements for the entire network is accelerated by almost a factor of two. Greater acceleration can be achieved by splitting the network graph into a larger number of sub-regions. The techniques of the disclosure may split the network into any number of sub-regions including two or more nodes in each sub-region, and the disclosure is not limited in this respect.

The computing device may split the network into two or more sub-regions based on one or more metrics for each node and/or edge in the neighborhood graph. For example, based on one or more metrics for each node and/or edge in the neighborhood graph, the computing device determines which connections (e.g., edges) to disable to split the network into two or more sub-regions. For example, the computing device may consider one or more metrics including a number of other nodes that the current node is connected to (i.e., a number of edges associated with the node), a proportion of edges for the current node as compared to the number of edges for all of the other nodes in the network, a signal strength/RSSI value of each edge associated with the current node, a proportion of connections across all neighboring nodes, and/or any other metric that may be used to characterize the node(s) and/or edge(s) in the network.

For example, referring again to FIGS. 8A and 8B, a single edge 804 connects sub-regions 802A and 802B, so the assumption that the two sub-regions 802A and 802B created by disabling connection 804 between AP8 and AP9 will be effectively isolated is likely to be valid. As another example, referring again to FIG. 8C, there are three edges 812, 814 and 816 connecting sub-regions 820A and 820B. This metric (the total number of edges or connections between the sub-regions 820A and 820B), in some examples also taken in combination with one or more other metrics (e.g., the signal strength/RSSI value associated with each of edges 812, 814 and 816 as compared to one or more other edges in the network, the number of edges associated with each of the nodes or the relative proportion of the number of edges associated with each node, etc.) means that the assumption that the two sub-regions 820A and 820B created by disabling connections 812, 814 and 816 will be effectively isolated is likely to be valid. In addition, there is a single edge 818 connecting sub-regions 820B and 820C, so the assumption that the two sub-regions 820A and 820C created by disabling connection 818 between AP14 and AP15 will be effectively isolated is also likely to be valid.

Figure 9A:
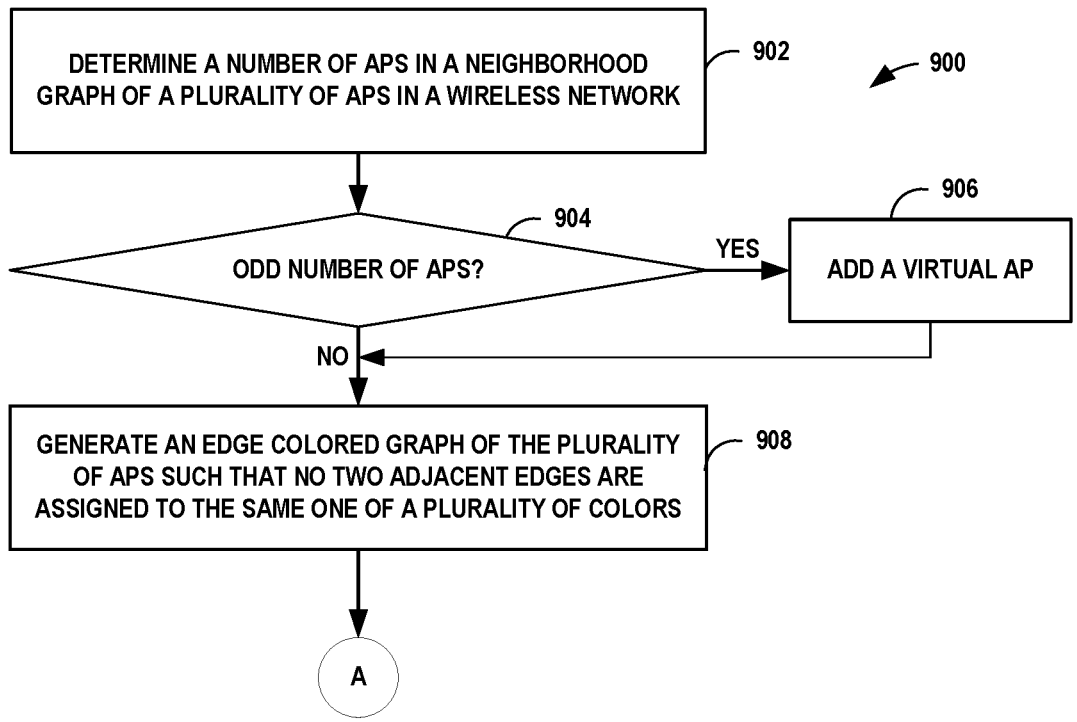
FIGS. 9A-9C are a flowchart of an example process by which a computing device orchestrates RTT measurements between a plurality of APs in a wireless network in accordance with one or more techniques of the disclosure.
Figure 9B:
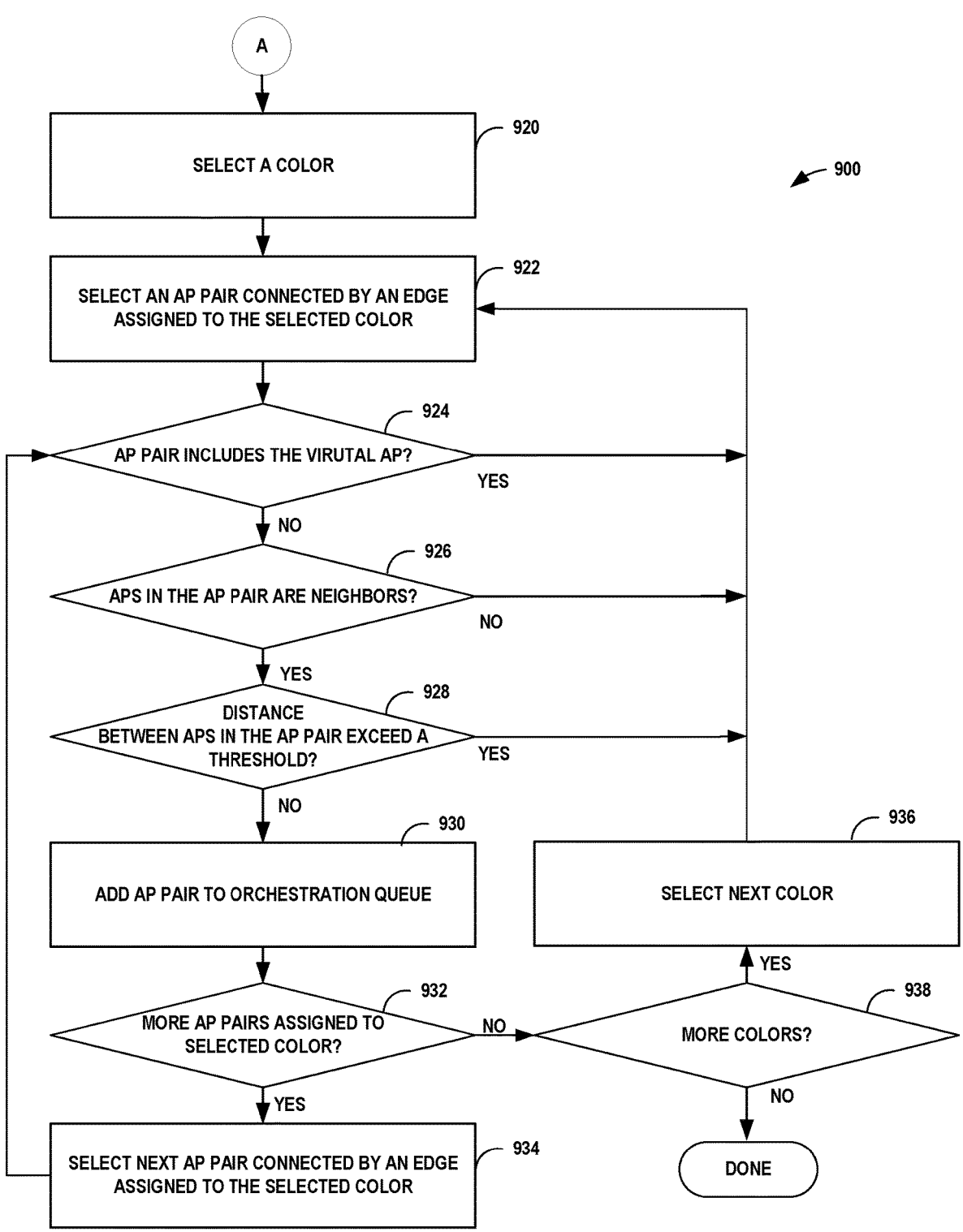
Figure 9C:
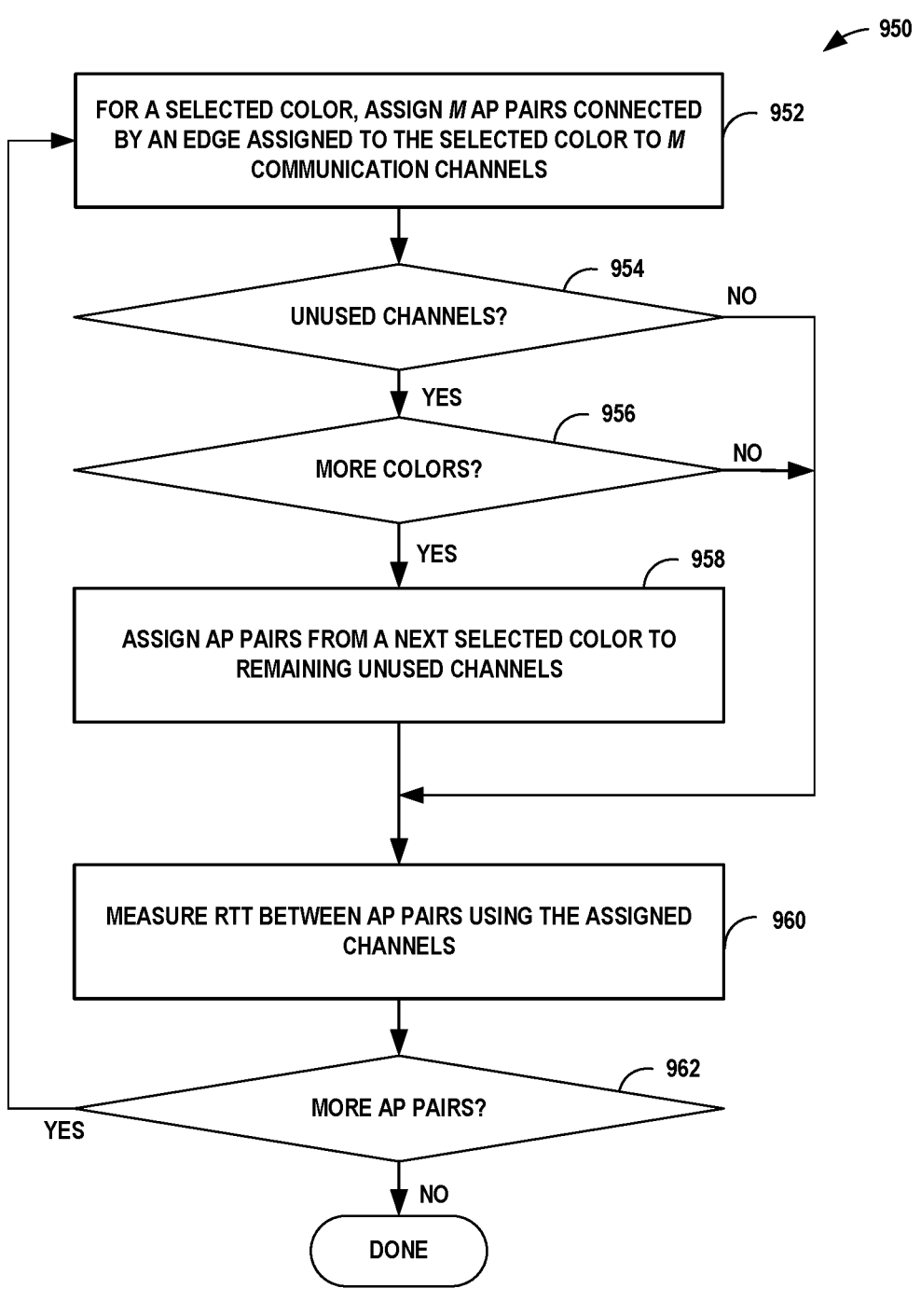

FIGS. 9A-9C are flowcharts of an example processes (900) and (950) by which a computing device, such as NMS 130/300 or other computing device executing RTT orchestration module 133/360), orchestrates RTT measurements between a plurality of APs in a wireless network in accordance with one or more techniques of the disclosure. The computing device determines a number of APs in a neighborhood graph of a plurality of APs in a wireless network (902). Then neighborhood graph is indicative of neighbor relationships between the APs. In some examples, if there are an odd number of APs (e.g., an odd number of nodes in the neighborhood graph) (YES branch of 904) the computing device adds a virtual AP to the plurality of APs such that the network includes an even number of APs (906). The virtual AP may be stored in the neighborhood graph as a node that does not have any neighbor relationships between the other APs in the network. Alternatively, the virtual AP is not stored in the neighborhood graph. The neighborhood graph may be represented by, for example, an adjacency list, an adjacency matrix, an adjacency set, or by any other data structure(s) that may be used to store a representation of the neighbor relationships between nodes of a network. The neighborhood graph may be stored as, for example, part of network graph data 138/317 as shown in FIGS. 1A, 1B and 3.

The computing device generates a network graph for the plurality of APs in the network (908) and assigns identifiers (e.g., colors) to the edges of the network graph such that no two adjacent edges are assigned to the same one of a plurality of colors. In some examples, the network graph is a different graph than the neighborhood graph. In some examples, the network graph is an edge-colored graph in which edges are assigned such that no two adjacent edges are assigned to the same one of a plurality of colors. For example, the computing device may assign one or more colors (or any other unique identifier) to the edges of a graph wherein each AP is connected to every other AP (plus a virtual AP in the event that the network includes an odd number of APs) by one unique edge such that no two adjacent edges are assigned to the same color. The one or more identifiers, e.g., colors, may include an optimal number of identifiers. In some examples, the optimal number of colors is (N−1). Two edges are said to be adjacent if they are connected to the same vertex (node) in the graph. In some examples, the edge-colored graph is a complete graph wherein each of N nodes (APs) is connected to every other node by exactly one unique edge and in which the edges are colored with (N−1) colors while maintaining the condition that edges with the same color do not have any common nodes.

In some examples, once the edges are assigned to the different colors, AP pairs assigned to the same color may perform RTT measurements in parallel. In some examples, the computing device further limits the number of RTT measurements to be performed by checking each AP pair against one or more criteria. The computing device selects one of the plurality of colors for which to check each AP pair (920). The computing device selects an AP pair connected by an edge assigned to the selected color (922). The computing device determines whether the AP pair includes the virtual AP (924). If the AP pair includes the virtual AP (YES branch of 924) the computing device continues to select another AP pair connected by an edge assigned to the selected color (922). This is because AP pairs including the virtual AP do not need to perform an RTT measurement.

If the AP pair does not include the virtual AP (NO branch of 924), the computing device determines whether the two APs of the AP pair are neighbors of each other (926). For example, the computing device determines whether the two APs of the AP pair are neighbors in the neighborhood graph. If the two APs are not neighbors (NO branch of 926), any RTT measurements are likely to be unreliable as the strength of the wireless signal between the two APs is insufficient for reliable communication between the two APs. The computing device continues to select another AP pair connected by an edge assigned to the selected color (922).

If the two APs are neighbors (YES branch of 926), the computing device determines whether a distance between the two APs of the AP pair exceeds a threshold distance (928). For example, if the distance between the two APs of the AP pair exceeds a threshold distance, the strength of the wireless signal between the two APs is likely to be insufficient for reliable RTT measurements due to the distance between the two APs. The computing device continues to select another AP pair connected by an edge assigned to the selected color (922). The threshold distance corresponds to, for example, a distance at which RTT measurements between APs have been determined to be reliable, or alternatively, a distance at which transmission from a first AP may not interfere with reception of a signal by a second AP where the signal is transmitted from a third AP that is a neighbor of the second AP. In some examples, the threshold distance may be configurable based on the properties of the network (e.g., number or arrangement of the APs in the network) and/or properties of the site itself (inside or exterior deployment, size of the structure, building materials, presence of obstructions, etc.).

If the distance between the two APs does not exceed the threshold distance (NO branch of 928), the computing device adds the AP pair to an orchestration queue (930). In some examples, rather than adding the AP pair to an orchestration queue, the computing device instead marks the AP pair or otherwise indicates that RTT measurements should be performed between the AP pair.

The computing device determines whether there are more AP pairs assigned to the selected color (932). If so (YES branch of 932), the computing device selects the next AP pair assigned to the selected color (934). The computing device then repeats steps (924)-(932) for the selected AP pair.

If there are no more AP pairs assigned to the selected color (NO branch of 932), the computing device determines whether there are more colors to be checked (938). If there are more colors to be checked (YES branch of 938), the computing device selects the next color (936) and repeats steps (922)-(934) for the AP pairs connected by an edge assigned to the next selected color.

If there are no more colors to be checked (NO branch of 938), all AP pairs have been checked against the one or more criteria (e.g., (924), (926) and/or (928)) and the computing device has determined the set of AP pairs between which RTT measurements are to be performed. The set of AP pairs is either stored in the orchestration queue (e.g., (930)) or otherwise marked or indicated as an AP pair for which RTT measurements are to be performed.

In some examples, the AP pairs are placed in the orchestration queue based on the color assigned to their connecting edge, such that all AP pairs connected by an edge assigned to the same color are placed in consecutive positions in the orchestration queue. For example, in a first-in first-out (FIFO) implementation of the orchestration queue, the order in which the AP pairs are placed in the queue corresponds to the order in which the AP pairs are removed from the queue and assigned to perform RTT measurements.

In some examples, checking each AP pair against the one or more criteria (e.g., (924), (926), and/or (928)) reduces the total number of RTT measurements which need to be taken while still obtaining meaningful RTT measurement information for the network as a whole. By reducing the total number of RTT measurements, the speed at which RTT measurements for the entire network can be completed is increased. In addition, network downtime is reduced or eliminated.

Referring now to FIG. 9C, to orchestrate the RTT measurements (950), the computing device assigns M AP pairs connected by an edge assigned to a selected color to M communication channels (952). For example, if there are 9 non-DFS frequency channels, the computing device obtains 9 AP pairs connected by an edge assigned to the same color and assigns each of the 9 AP pairs to a different one of the 9 available channels. In cases where the number of AP pairs connected by an edge assigned to the same color corresponds to the total number of available channels, e.g., there are no unused channels in the current iteration (NO branch of 954), the computing device configures the AP pairs to perform parallel RTT measurements using the assigned channels (960).

In cases where the number of AP pairs connected by an edge assigned to the same color during the current iteration is less than the total number of available channels, e.g., there are unused channels in the current iteration (YES branch of 954), the computing device determines whether there are more colors for which RTT measurements are to be performed (956). If so (YES branch of 956), the computing device obtains the remaining number of AP pairs assigned to a next selected color and assigns the remaining channels to those AP pairs connected by an edge assigned to the next selected color (958). In such cases, it is unlikely that a conflict will occur between AP pairs assigned to the selected color (952) and AP pairs assigned to the next selected color (958). In general, the likelihood of a conflict is low and the resulting increase in efficiency realized by using all of the available channels for RTT measurement rather than leave unused channels during an iteration overcomes any risk of conflicts arising. The computing device configures the APs to perform parallel RTT measurements using the assigned channels (960).

The computing device determines whether there are any more AP pairs in the orchestration queue (962). If so, (YES branch of 962), the computing device repeats steps (952)-(962) until all RTT measurements have been performed between all AP pairs (e.g., there are no more AP pairs in the orchestration queue or otherwise indicated as an AP pair for which RTT measurements are to be performed) (NO branch of 962).

By performing RTT measurements between AP pairs based on assigned colors as described above with respect to FIGS. 9A-9C, the speed at which the RTT measurements for the entire network may be obtained is increased significantly in many cases. In addition, because only a subset of APs (e.g., the APs from (usually) a single color currently assigned to the channels available for RTT measurement) are performing RTT measurements at any given time, the network may continue to be operational using the remaining APs in the network without a significant decrease in network performance. Downtime of the network (i.e., times during which the network as a whole must be taken out of service to perform RTT measurements) is thus greatly reduced or eliminated while optimizing/increasing the speed at which such RTT measurements can be performed.

Figure 9D:
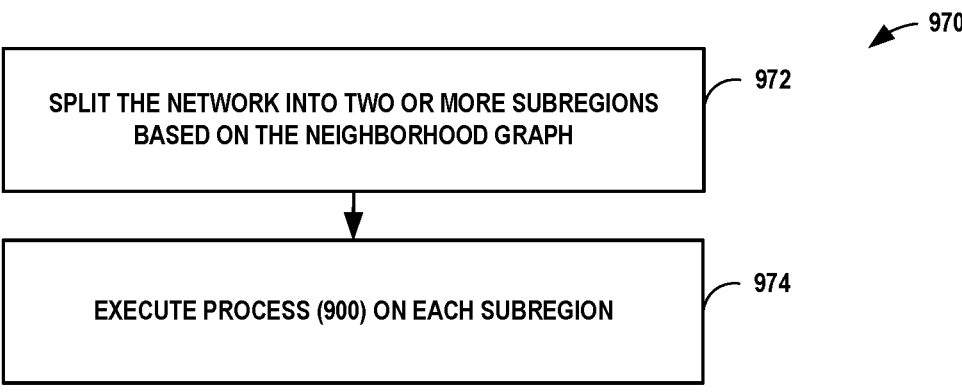
FIG. 9D is a flowchart of an example process by which a computing device subdivides a network into one or more sub-regions in accordance with one or more techniques of the disclosure.

FIG. 9D is a flowchart of an example process (970) by which a computing device, such as NMS 130/300 or other computing device executing RTT orchestration module 133/360), splits a network into one or more sub-regions in accordance with one or more techniques of the disclosure. The computing device splits the network into two or more sub-regions based on the neighborhood graph (972). The computing device executes the process (900) as described above with respect to FIGS. 9A and 9B for each sub-region (974). By splitting the network into two or more sub-regions, the number of APs in each sub-region is relatively lower than the total number of APs in the network. In most cases, the number of colors needed to edge color a graph of each sub-region is also relatively lower as compared to the number of colors needed to edge color a graph of the network as a whole. This results in a corresponding reduction in the number of iterations needed to complete the RTT measurements for each sub-region and, because RTT measurements for each sub-region may be taken simultaneously (in parallel), a corresponding reduction in the number of iterations needed to complete the RTT measurements for the network as a whole. The speed at which the RTT measurements for the entire network may thus be increased significantly in many cases. In addition, because only a subset of APs from each sub-region (e.g., the APs from (usually) a single color currently assigned to the channels available for RTT measurement) are performing RTT measurements at any given time, the network may continue to be operational using the remaining APs in the network without a significant decrease in network performance. Downtime of the network (e.g., times during which the network as a whole must be taken out of service to perform RTT measurements) is thus greatly reduced or eliminated while optimizing/increasing the speed at which such RTT measurements can be performed.

Figure 9E:
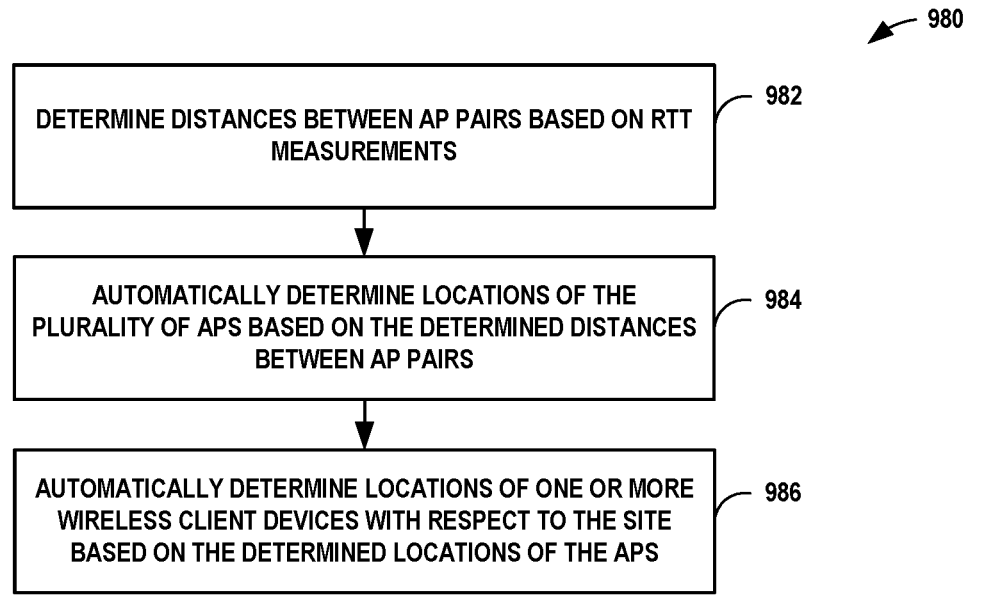
FIG. 9E is a flowchart of an example process by which a computing device automatically determines locations of APs in a wireless network based on RTT measurements between pairs of APs in accordance with one or more techniques of the disclosure.

FIG. 9E is a flowchart of an example process (980) by which a computing device may further utilize the RTT measurements obtained using example processes (900), (970) in accordance with one or more techniques of the disclosure. For example, a computing device, such as NMS 130/300 or other computing device executing RTT/FTM measurement module 135/362, automatically determines distances between AP pairs in the wireless network based on the RTT measurements (982).

In another example, a computing device, such as NMS 130/300 or other computing device executing deployed AP location module 372, automatically determines locations of one or more APs in the wireless network with respect to the site based on the determined distances between AP pairs (984). Example techniques for automatically determining locations (e.g., coordinates) of deployed APs are described in U.S. Provisional Patent Application No. 63/243,616, filed Sep. 13, 2021, and entitled "Determining Locations of Deployed Access Points;" U.S. patent application Ser. No. 17/810,173, filed Jun. 30, 2022, entitled "Determining Locations of Deployed Access Points," and which claims the benefit of U.S. Provisional Patent Application No. 63/243,616, filed Sep. 13, 2021; and U.S. Provisional Patent Application No. 63/363,353, filed Apr. 21, 2022, and entitled "Systems and Methods of Determining Floor Locations of Deployed Access Points;" each of which is incorporated by reference herein in its entirety.

In another example, a computing device, such as NMS 130/300 or other computing device executing location engine 370, automatically determines locations of one or more wireless client devices associated with the wireless network with respect to the site based on the determined locations of one or more APs (986). Example techniques for automatically determining locations of wireless client devices are described in U.S. patent application Ser. No. 16/147,327, filed Sep. 28, 2018, and entitled "Methods and Apparatus for Using Received Signal Strength Information in a Wireless System;" U.S. patent application Ser. No. 16/676,812, filed Nov. 7, 2019, and entitled "Wireless Signals for Location Determination;" U.S. patent application Ser. No. 16/915,381, filed Jun. 29, 2020, and entitled "Multi-Wireless Device Location Determination;" U.S. patent application Ser. No. 16/915,447, filed Jun. 29, 2020, and entitled "Determining Location Determination Based on Phase Differences;" U.S. patent application Ser. No. 17/453,752, filed Nov. 5, 2021, and entitled "Determining Location Based on Dynamic Path Loss Exponent (PLE) and Intercept (INT) Estimation;" and U.S. patent application Ser. No. 17/644,033, filed Dec. 13, 2021, and entitled "Wi-Fi Location Enhancement," each of which is incorporated by reference herein in its entirety.

The techniques of the disclosure may provide one or more technical advantages and practical applications. As an example, the techniques described herein reduce the amount of time it takes to obtain RTT measurements between a plurality of devices (e.g., APs or any other wireless devices) associated with a wireless network. In examples where the wireless devices are APs, neither AP of an AP pair can provide wireless networking services during performance of RTT measurements. It is therefore desirable to complete the RTT measurements for an entire network in the shortest amount of time in order to reduce downtime of the network. By orchestrating RTT measurements in accordance with the techniques of the disclosure, conflicts in which the same AP belonging to two or more different AP pairs assigned to perform RTT measurements during the same time period are avoided. At the same time, the number of RTT measurements between pairs of APs that can be performed in parallel is optimized, thus increasing the speed with which RTT measurements for the entire network can be performed. In some examples, the techniques further split a network of wireless devices into two or more sub-regions and configure the APs in each sub-region to perform parallel RTT measurements, thus increasing the number of RTT measurements that can be performed in parallel with minimal effect on the provision of wireless networking services. Further, the RTT measurements obtained using the orchestration techniques of the disclosure may be used as a basis to automatically determine locations of a plurality of deployed APs in a wireless network with respect to a global coordinate system for the site. The ability to automatically determine locations of deployed APs increases the speed and reduces the cost to deploy a wireless network because it is not necessary to dispatch technicians to conduct a survey of the entire site. RTT measurements also increase the accuracy of the determined AP locations as compared to the error-prone and time consuming process of manually measuring and logging of hundreds or even thousands of AP locations. The techniques therefore support the provision of highly accurate location-based services at a site, which depend upon the locations of each of AP being known to a high degree of accuracy, with minimal or no downtime required to execute the RTT measurements. In addition, the determined AP locations may further be used for RF coverage optimization and radio resource management of the APs at the site, such as channel and transmit power level selection.

The techniques described herein may be implemented using software, hardware and/or a combination of software and hardware. Various examples are directed to apparatus, e.g., mobile nodes, mobile wireless terminals, base stations, e.g., access points, communications system. Various examples are also directed to methods, e.g., method of controlling and/or operating a communications device, e.g., wireless terminals (UEs), base stations, control nodes, access points and/or communications systems. Various examples are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of example approaches. Based upon design preferences, it is understood that the specific order or hierarchy of steps in the processes may be rearranged while remaining within the scope of the present disclosure. The accompanying method claims present elements of the various steps in a sample order and are not meant to be limited to the specific order or hierarchy presented.

In various examples devices and nodes described herein are implemented using one or more modules to perform the steps corresponding to one or more methods, for example, signal generation, transmitting, processing, and/or receiving steps. Thus, in some examples various features are implemented using modules. Such modules may be implemented using software, hardware or a combination of software and hardware. In some examples each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various examples are directed to a machine-readable medium e.g., a non-transitory computer readable medium, including machine executable instructions for causing a machine, e.g., processor and associated hardware, to perform one or more of the steps of the above-described method(s). Some examples are directed to a device including a processor configured to implement one, multiple, or all of the steps of one or more methods of the one example aspect.

In some examples, the processor or processors, e.g., CPUs, of one or more devices, e.g., communications devices such as wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all examples are directed to a communications device, e.g., user equipment, with a processor which includes a module corresponding to each of the steps of the various described methods performed by the device in which the processor is included. In some but not all examples a communications device includes a module corresponding to each of the steps of the various described methods performed by the device in which the processor is included. The modules may be implemented purely in hardware, e.g., as circuits, or may be implemented using software and/or hardware or a combination of software and hardware.

Some examples are directed to a computer program product comprising a computer-readable medium comprising code for causing a computer, or multiple computers, to implement various functions, steps, acts and/or operations, e.g. one or more steps described above. In some examples, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some examples are directed to a processor configured to implement one or more of the various functions, steps, acts and/or operations of one or more methods described above. Accordingly, some examples are directed to a processor, e.g., CPU, graphical processing unit (GPU), digital signal processing (DSP) unit, etc., configured to implement some or all of the steps of the methods described herein. The processor may be for use in, e.g., a communications device or other device described in the present application.

Numerous additional variations on the methods and apparatus of the various examples described above will be apparent to those skilled in the art in view of the above description. Such variations are to be considered within the scope of this disclosure. The methods and apparatus may be, and in various examples are, used with BLE, LTE, CDMA, orthogonal frequency division multiplexing (OFDM), and/or various other types of communications techniques which may be used to provide wireless communications links between access nodes and mobile nodes. In some examples the access nodes are implemented as base stations which establish communications links with user equipment devices, e.g., mobile nodes, using OFDM and/or CDMA. In various examples the mobile nodes are implemented as notebook computers, personal data assistants (PDAs), or other portable devices including receiver/transmitter circuits and logic and/or routines, for implementing the methods.

In the detailed description, numerous specific details are set forth in order to provide a thorough understanding of some examples. However, it will be understood by persons of ordinary skill in the art that some examples may be practiced without these specific details. In other instances, well-known methods, procedures, components, units and/or circuits have not been described in detail so as not to obscure the discussion.

Some examples may be used in conjunction with various devices and systems, for example, a User Equipment (UE), a Mobile Device (MD), a wireless station (STA), a wireless terminal (WT), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some examples may be used in conjunction with devices and/or networks operating in accordance with existing Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmcTM/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)), IEEE 802.11-2016 and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, August 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, or operate using any one or more of the above protocols, and the like.

Some examples may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some examples may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other examples may be used in various other devices, systems and/or networks.

Some demonstrative examples may be used in conjunction with a WLAN (Wireless Local Area Network), e.g., a Wi-Fi network. Other examples may be used in conjunction with any other suitable wireless communication network, for example, a wireless area network, a "piconet", a WPAN, a WVAN, and the like.

Some examples may be used in conjunction with a wireless communication network communicating over a frequency band of 2.4 Ghz, 5 GHz and/or 60 GHz. However, other examples may be implemented utilizing any other suitable wireless communication frequency band(s), for example, an Extremely High Frequency (EHF) band (the millimeter wave (mmWave) frequency band), e.g., a frequency band within the frequency band of between 20 GhH and 300 GHz, a WLAN frequency band, a WPAN frequency band, a frequency band according to the WGA specification, and the like.

While the above provides just some simple examples of the various device configurations, it is to be appreciated that numerous variations and permutations are possible. Moreover, the technology is not limited to any specific channels, but is generally applicable to any frequency range(s)/channel(s). Moreover, and as discussed, the technology may be useful in the unlicensed spectrum.

Although examples are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although examples are not limited in this regard, the terms "plurality" and "a plurality" as used herein may include, for example, "multiple" or "two or more." The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The examples have been described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the examples illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links, including any communications channel(s)/elements/lines connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the examples described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The examples are described in relation to enhanced communications. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

The example systems and methods are described in relation to IEEE 802.11 and/or Bluetooth® and/or Bluetooth® Low Energy transceivers and associated communication hardware, software and communication channels. However, to avoid unnecessarily obscuring the present disclosure, the following description omits well-known structures and devices that may be shown in block diagram form or otherwise summarized.

While the above-described flowcharts have been discussed in relation to a particular sequence of events, it should be appreciated that changes to this sequence can occur without materially effecting the operation of the example(s). Additionally, the example techniques illustrated herein are not limited to the specifically illustrated examples but can also be utilized with the other examples and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, Wi-Fi, LTE, 4G, Bluetooth®, WirelessHD, WiGig, WiGi, 3GPP, Wireless LAN, WiMAX, DensiFi SIG, Unifi SIG, 3GPP LAA (licensed-assisted access), and the like.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hardwired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the examples is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed techniques may be readily implemented in software and/or firmware that can be stored on a storage medium to improve the performance of a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there have at least been provided systems and methods for enhancing and improving conversational user interface. Many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

What is claimed is:

1. A computing system configured to orchestrate round-trip time (RTT) measurements in a network of a plurality of wireless devices, the computing system comprising:
   one or more processors; and
   memory comprising instructions that when executed by the one or more processors cause the one or more processors to:
      generate a network graph of the plurality of wireless devices in which each wireless device pair of a plurality of wireless device pairs of the network graph is connected by an edge assigned to an identifier, wherein each edge of at least two adjacent edges is assigned a different identifier; and
      orchestrate the RTT measurements such that RTT measurements between wireless device pairs connected by edges assigned to a same identifier are performed in parallel and are performed during a different iteration as RTT measurements between wireless device pairs connected by edges assigned to different identifiers.

2. The computing system of claim 1,
   wherein to generate the network graph, the memory further comprises instructions that when executed by the one or more processors cause the one or more processors to generate an edge colored graph in which each wireless device pair of the plurality of wireless device pairs is connected by an edge assigned to a color, wherein each edge of at least two adjacent edges is assigned a different color, and
   wherein to orchestrate the RTT measurements, the memory further comprises instructions that when executed by the one or more processors cause the one or more processors to orchestrate the RTT measurements such that RTT measurements between wireless device pairs connected by edges assigned to a same color are performed in parallel.

3. The computing system of claim 1, wherein the wireless devices comprise access points (APs) configured to provide a wireless network.

4. The computing system of claim 1, the memory further comprising instructions that when executed by the one or more processors cause the one or more processors to:
   assign one or more different communication channels to a group of one or more wireless device pairs assigned to the same identifier; and cause the one or more wireless device pairs to perform parallel RTT measurements using the assigned one or more different communication channels.

5. The computing system of claim 4, wherein the one or more different communication channels comprise at least one of 20 MHz communication channels, 40 MHz communication channels, 80 MHz communication channels, or 160 MHz communication channels.

6. The computing system of claim 4, wherein during a first iteration the one or more different communication channels are assigned to a first group of one or more wireless device pairs assigned to a first identifier and during a second iteration the one or more different communication channels are assigned to a second group of one or more wireless device pairs assigned to a second identifier.

7. The computing system of claim 1, the memory further comprising instructions that when executed by the one or more processors cause the one or more processors to:
add the plurality of wireless device pairs to an orchestration queue such that wireless device pairs assigned to the same identifier are grouped together in the orchestration queue.

8. The computing system of claim 1, the memory further comprising instructions that when executed by the one or more processors cause the one or more processors to:
determine a group of one or more wireless device pairs for parallel RTT measurements based on a neighborhood graph indicative of neighbor relationships between the plurality of wireless devices.

9. The computing system of claim 1, the memory further comprising instructions that when executed by the one or more processors cause the one or more processors to:
based on a neighborhood graph indicative of neighbor relationships between the plurality of wireless devices, determine a distance between each wireless device pair having a neighbor relationship,
wherein the plurality of wireless device pairs do not include wireless device pairs having a determined distance exceeding a threshold distance.

10. The computing system of claim 1, wherein the plurality of wireless devices comprises an even number of wireless devices, and wherein one of the plurality of wireless devices includes a virtual wireless device.

11. The computing system of claim 1, the memory further comprising instructions that when executed by the one or more processors cause the one or more processors to:
based on a neighborhood graph indicative of neighbor relationships between the plurality of wireless devices, split the network graph of the plurality of wireless devices into two or more sub-regions and configure one or more wireless device pairs in each sub-region to perform parallel RTT measurements.

12. The computing system of claim 11, the memory further comprising instructions that when executed by the one or more processors cause the one or more processors to:
split the network graph of the plurality of wireless devices into the two or more sub-regions based on at least one of distances between wireless device pairs in the neighborhood graph and a number of edges associated with each device in the neighborhood graph.

13. A method of orchestrating round-trip time (RTT) measurements in a network of a plurality of wireless devices, comprising:
generating a network graph of the plurality of wireless devices in which each wireless device pair of a plurality of wireless device pairs of the network graph is con-nected by an edge assigned to an identifier, wherein each edge of at least two adjacent edges is assigned a different identifier; and
orchestrating the RTT measurements such that RTT measurements between wireless device pairs connected by edges assigned to a same identifier are performed in parallel and are performed during a different iteration as RTT measurements between wireless device pairs connected by edges assigned to different identifiers.

14. The method of claim 13 wherein generating the network graph further comprises:
generating an edge colored graph in which each wireless device pair is connected by an edge assigned to a color, wherein each edge of at least two adjacent edges is assigned to a different color, and
wherein orchestrating the RTT measurements comprises orchestrating the RTT measurements such that RTT measurements between wireless device pairs connected by edges assigned to the same identifier are performed in parallel.

15. The method of claim 13, wherein the plurality of wireless devices include access points (APs) configured to provide a wireless network.

16. The method of claim 13, further comprising:
assigning one or more different communication channels to a group of one or more wireless device pairs assigned to the same identifier; and
causing the one or more wireless device pairs to perform parallel RTT measurements using the assigned one or more different communication channels.

17. The method of claim 16, wherein the one or more different communication channels comprise at least one of 20 MHz communication channels, 40 MHz communication channels, 80 MHz communication channels, or 160 MHz communication channels.

18. The method of claim 16, wherein during a first iteration the one or more different communication channels are assigned to a first group of one or more wireless device pairs assigned to a first identifier and during a second iteration the one or more different communication channels are assigned to a second group of one or more wireless device pairs assigned to a second identifier, wherein the first iteration and the second iteration are not successive iterations.

19. The method of claim 13, further comprising:
determining a group of one or more wireless device pairs for parallel RTT measurements based on a neighborhood graph indicative of neighbor relationships between the plurality of wireless devices.

20. Non-transitory computer-readable media comprising instructions that when executed by one or more processors cause the one or more processors to:
generate a network graph of a plurality of wireless devices of a network in which each wireless device pair of a plurality of wireless device pairs of the network graph is connected by an edge assigned to an identifier, wherein each edge of at least two adjacent edges are assigned a different identifier; and
orchestrate round-trip time (RTT) measurements such that RTT measurements between wireless device pairs connected by edges assigned to a same identifier are performed in parallel and are performed during a different iteration as RTT measurements between wireless device pairs connected by edges assigned to different identifiers.

* * * * *